(12) United States Patent
Yamaguchi et al.

(10) Patent No.: US 10,013,068 B2
(45) Date of Patent: Jul. 3, 2018

(54) INFORMATION PROCESSING APPARATUS INCLUDING A MIRROR CONFIGURED TO REFLECT AN IMAGE AND A PROJECTOR AND AN IMAGE CAPTURING UNIT ARRANGED BELOW THE MIRROR

(71) Applicant: CANON KABUSHIKI KAISHA, Tokyo (JP)

(72) Inventors: Takuya Yamaguchi, Nagareyama (JP); Haruhiko Nakatsu, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 14/872,734

(22) Filed: Oct. 1, 2015

(65) Prior Publication Data

US 2016/0103498 A1    Apr. 14, 2016

(30) Foreign Application Priority Data

Oct. 8, 2014  (JP) ................................. 2014-207544
Aug. 28, 2015  (JP) ................................. 2015-169727

(51) Int. Cl.

| G09G 5/00 | (2006.01) |
|---|---|
| G06F 3/01 | (2006.01) |
| G06F 3/00 | (2006.01) |
| G03B 21/28 | (2006.01) |
| G03B 17/17 | (2006.01) |
| G03B 17/54 | (2006.01) |

(52) U.S. Cl.
CPC ............ *G06F 3/017* (2013.01); *G03B 17/17* (2013.01); *G03B 17/54* (2013.01); *G03B 21/28* (2013.01); *G06F 3/005* (2013.01)

(58) Field of Classification Search
None
See application file for complete search history.

(56) References Cited

U.S. PATENT DOCUMENTS

| 6,554,434 B2 * | 4/2003 | Sciammarella ....... G06F 3/0425 353/28 |
|---|---|---|
| 6,981,905 B2 | 1/2006 | Yakou et al. |
| 7,258,588 B2 | 8/2007 | Yakou et al. |
| 2004/0183775 A1 * | 9/2004 | Bell .................... G06F 3/011 345/156 |
| 2014/0292647 A1 * | 10/2014 | Murase ................ G03B 17/54 345/156 |

FOREIGN PATENT DOCUMENTS

| JP | 2008-134793 A | 6/2008 | |
|---|---|---|---|
| JP | 2014-204196 A | 10/2014 | |
| WO | WO 2015016864 A1 * | 2/2015 | ........... G06F 1/1605 |

* cited by examiner

Primary Examiner — Ilana Spar
Assistant Examiner — Kirk Hermann
(74) Attorney, Agent, or Firm — Fitzpatrick, Cella, Harper & Scinto

(57) ABSTRACT

An information processing apparatus includes a projection unit that projects an image, a projection mirror that reflects an image projected by the projection unit towards a projection surface, an image capturing unit that captures an image of a subject placed on the projection surface, and an image capturing mirror that is arranged in an image capturing optical path from the subject to the image capturing unit in order to capture an image of the subject placed on the projection surface. The projection unit and the image capturing unit are arranged below the projection mirror and the image capturing mirror.

30 Claims, 19 Drawing Sheets

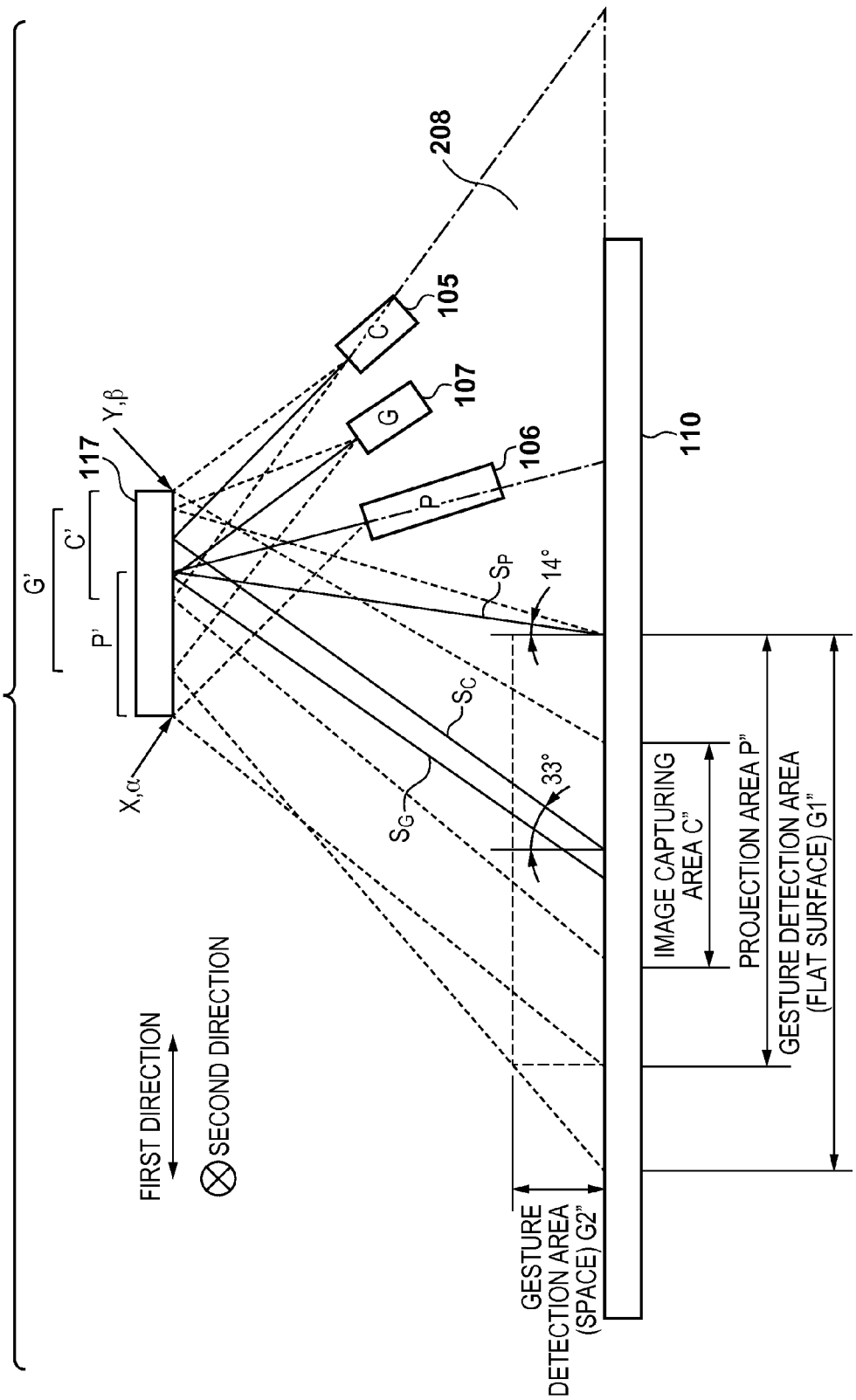

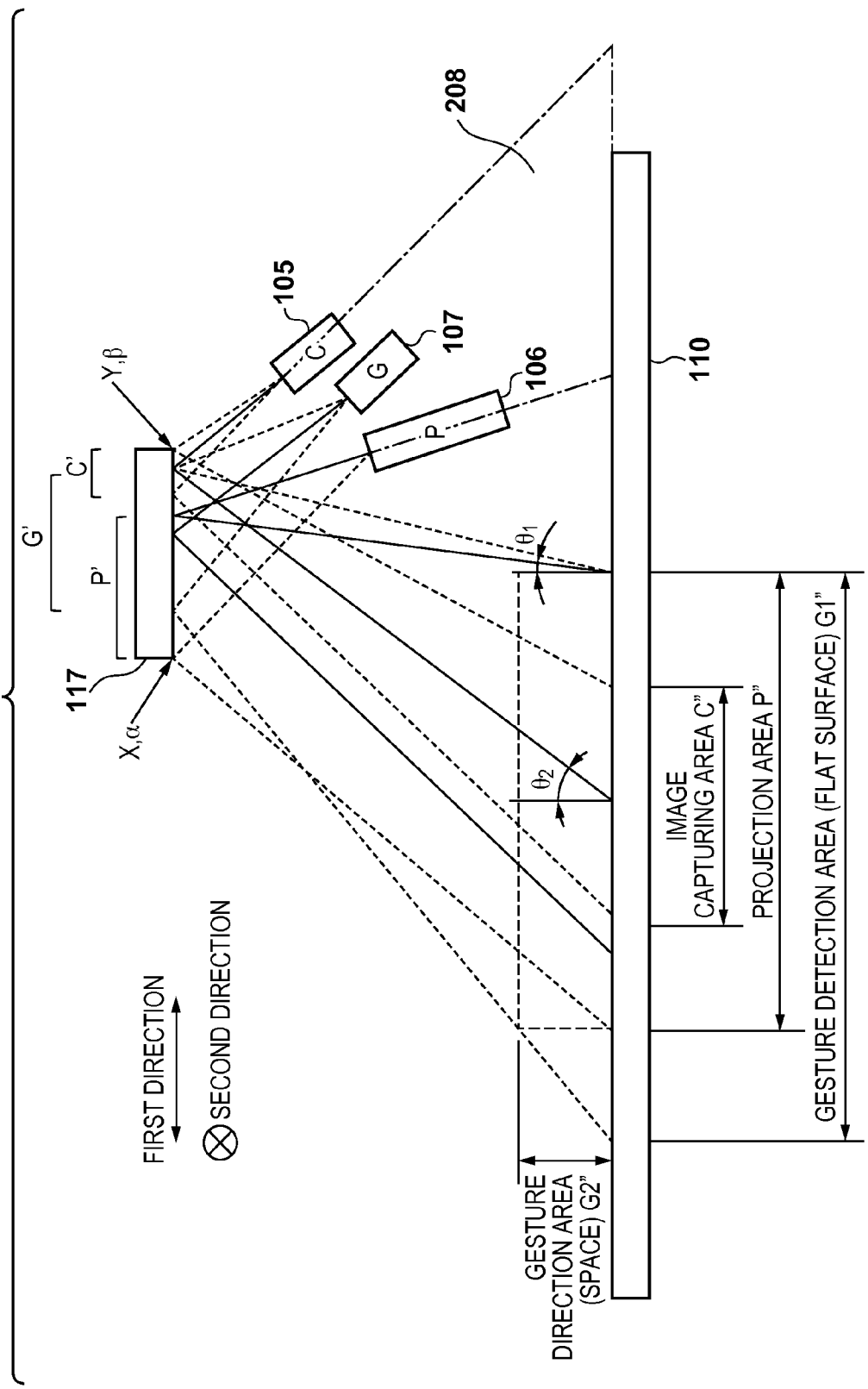

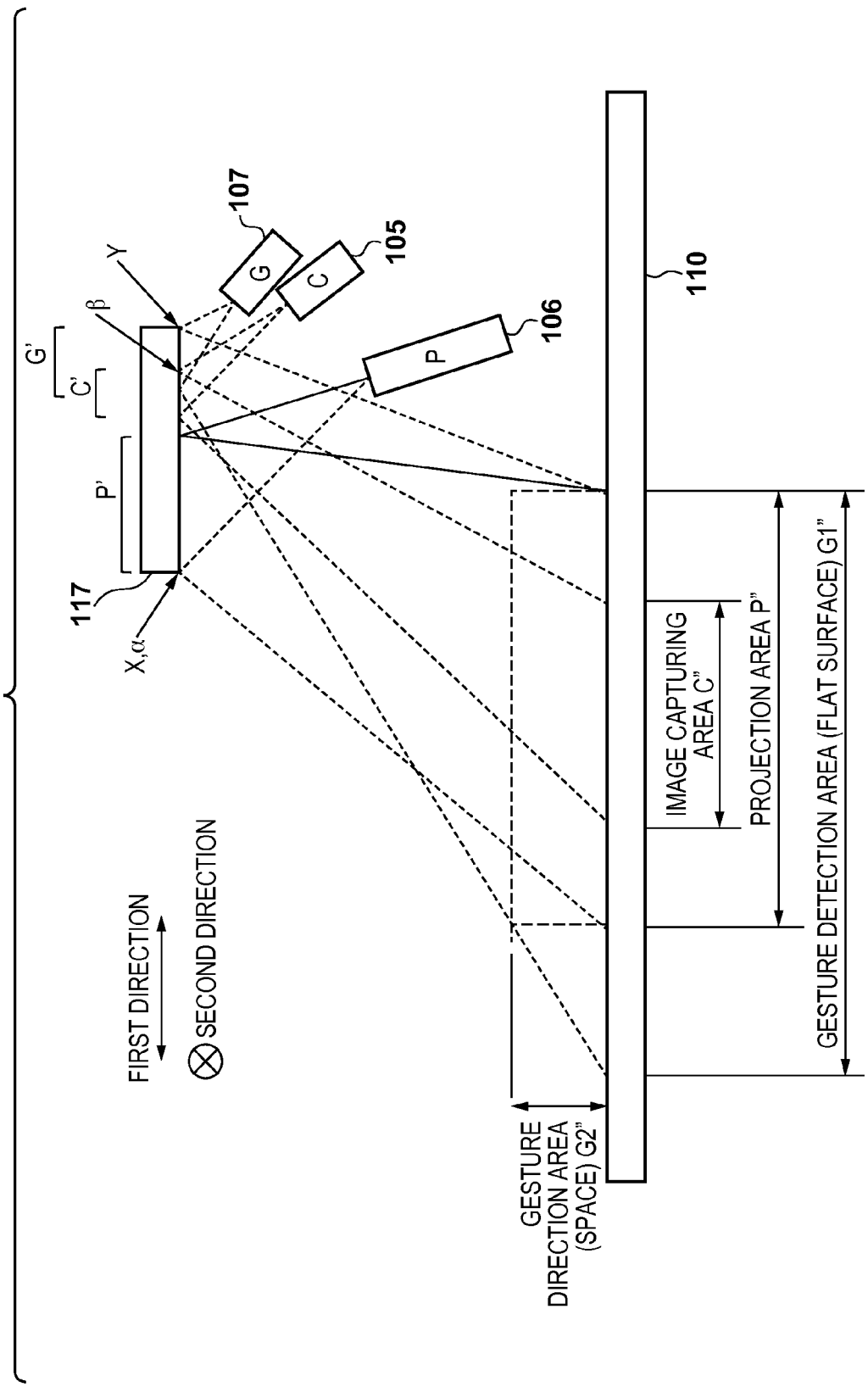

INFORMATION PROCESSING APPARATUS INCLUDING A MIRROR CONFIGURED TO REFLECT AN IMAGE AND A PROJECTOR AND AN IMAGE CAPTURING UNIT ARRANGED BELOW THE MIRROR

BACKGROUND OF THE INVENTION

Field of the Invention

The present invention relates to an information processing apparatus that has a projection unit that projects data onto a platform, an image capturing unit that scans a subject on the platform, and a detection unit that detects motions made by a user.

Description of the Related Art

A user interface system is used in which intuitive operations are performed by recognizing a gesture made by the user with respect to a video projected by a projector. In such a system, a user gesture made with respect to a projected video is recognized using a touch panel and video recognition technology.

Japanese Patent Laid-Open No. 2014-204196 discloses an interactive projector in which the projection unit projects a video onto a projection target such as a table, a first camera captures an image of and analyzes hand motion made by the user with respect to the projection image, and an image that corresponds to the hand motion is projected onto a projection surface by the projection unit. In the case of recording text information or the like placed on the projection surface, an image with a higher resolution can be recorded by capturing an image with a high-resolution second camera.

In this apparatus, the image projected upward by the projection unit that is provided below the main body is reflected by a reflection unit that is provided above the main body, and is projected onto the projection surface. Meanwhile, captured images of hand motions made by the user with respect to the projection image are captured and analyzed with the first camera. Also, an image of a subject placed on the projection surface is captured by the second camera that is provided in the vicinity of the reflection unit.

In the information processing apparatus disclosed in Japanese Patent Laid-Open No. 2014-204196, the projection unit, which is arranged below the main body, projects light toward the mirror, which is arranged higher in the main body than the projection unit is, and the image is projected onto the projection surface by light reflected by the mirror. Meanwhile, the image capturing unit faces the projection surface below, and captures an image of the image projected onto the projection surface. A portion of the light beam projected by the projection unit from below the main body becomes stray light due to repeatedly undergoing irregular reflection and refraction. There are cases in which this stray light causes defects in captured images, such as flares, due to entering the image capturing unit without being projected onto the projection surface onto which projection is to be performed.

SUMMARY OF THE INVENTION

The present invention has been made in view of the above issues, and in an information processing apparatus that includes a projection unit that projects data onto a platform and an image capturing unit that scans the subject on the platform, the occurrence of defects in images captured by the image capturing unit is suppressed.

According to a first aspect of the present invention, there is provided an information processing apparatus comprising: a projection unit configured to project an image; a projection mirror configured to reflect an image projected by the projection unit towards a projection surface; an image capturing unit configured to capture an image of a subject placed on the projection surface; and an image capturing mirror configured to be arranged in an image capturing optical path from the subject to the image capturing unit in order to capture an image of the subject placed on the projection surface using the image capturing unit, wherein the projection unit and the image capturing unit are arranged below the projection mirror and the image capturing mirror.

Further features of the present invention will become apparent from the following description of exemplary embodiments with reference to the attached drawings.

BRIEF DESCRIPTION OF THE DRAWINGS

FIG. 10 is a side view illustrating an optical path of the information processing apparatus according to the first embodiment.

FIG. 18 is a side view illustrating an optical path of an information processing apparatus according to a second embodiment.

FIG. 19 is a diagram showing an optical path in a case in which the arrangement of a camera and a gesture sensor is reversed.

DESCRIPTION OF THE EMBODIMENTS

First Embodiment

The first embodiment of the present invention will be described in detail below with reference to the accompanying drawings. Constituent elements described in the following embodiments are merely examples and the scope of the present invention is in no way limited to only these examples.

Figure 1A:
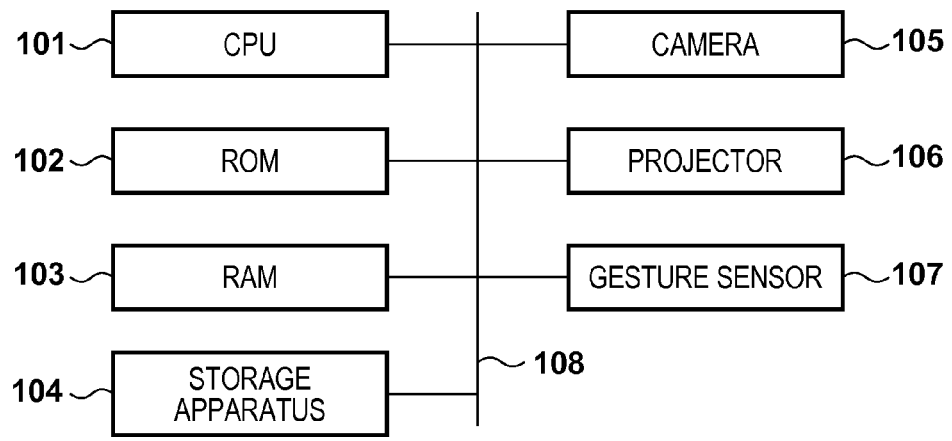
FIGS. 1A and 1B are diagrams showing a configuration of an information processing apparatus according to a first embodiment.

FIG. 1A is a diagram showing a configuration of the hardware of the information processing apparatus according to the present embodiment. In FIG. 1A, a CPU 101 made up of a microcomputer performs arithmetic operations, logical determination, and the like for various types of processing, and controls the constituent elements that are connected to a system bus 108. A ROM 102 is a program memory that stores programs for control to be performed by the CPU 101. A RAM 103 is a data memory that has a work area for the above-mentioned programs for the CPU 101, a save area for data during error processing, and a load area for the above-mentioned control programs, for example. A storage apparatus 104 is constituted by a hard disk, an externally connected memory apparatus, or the like, and the storage apparatus 104 stores various types of data such as electronic data and programs according to the present embodiment. A camera 105 captures an image of a work space in which the user performs an operation, and provides the captured image to a system as an input image. A projector 106 projects video including electronic data and user interface components onto the work space. A gesture sensor 107 is, for example, an infrared light sensor that detects detection target motion such as a hand motion made by the user in the work space, and based on this detection, detects whether or not the user has touched an operation button or the like that is projected onto a projection surface 110 (see FIG. 4). In the present embodiment, the projection surface 110 is a flat surface located below the information processing apparatus, and is, for example, the surface of a table onto which the information processing apparatus 109 is placed. Note that a configuration is possible in which the projection surface 110 is provided such that an image can be projected by the projector 106 onto a portion of the information processing apparatus 109 such that an image can be projected by the projector 106.

Figure 1B:
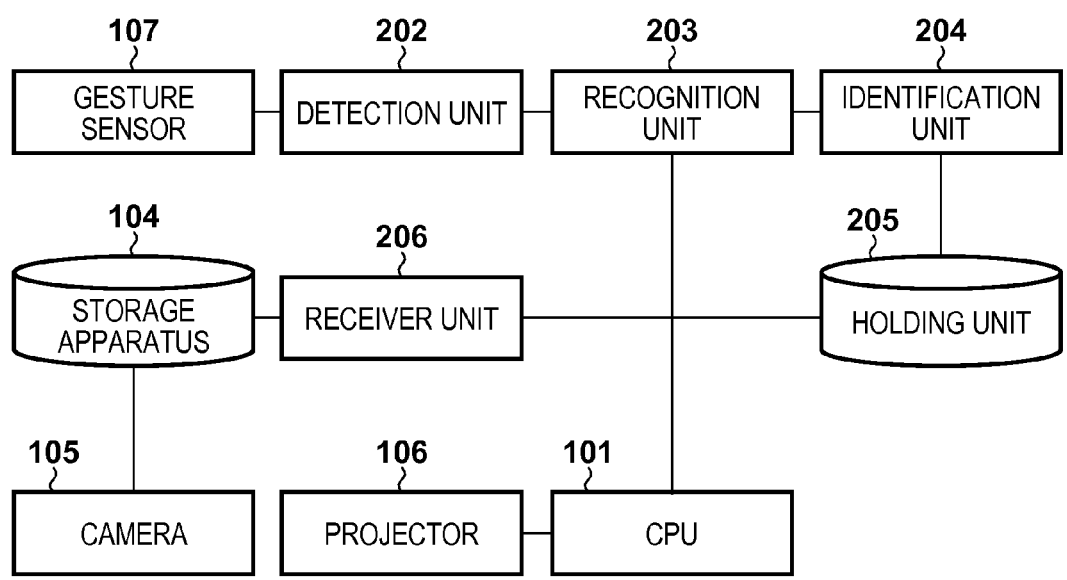

FIG. 1B is a diagram showing the functional configuration of the information processing apparatus according to the present embodiment. In FIG. 1B, the camera 105 captures an image of the subject placed on the projection surface 110, such as a document that was hand written by the user, and determines the characters and the like of the document. Also, the projector 106 projects a user interface screen or the like onto the projection surface 110 (see FIG. 4). The projector 106 can also project an image that was captured by the camera 105. The gesture sensor 107 emits infrared light and detects an operation made by a hand of the user or the like in the work space on the projection surface 110 (see FIG. 4) with respect to the user interface, etc. projected by the projector 106 onto the projection surface 110. When the user interface is operated with a hand of the user or the like, the image projected by the projector 106 changes, and image capturing is performed by the camera 105. A detection unit 202 is constituted by the CPU, the ROM, and the RAM (hereinafter, the CPU 101 etc.), and detects an area in which a hand of the user exists and an area in which a finger of the hand of the user exists using a detection signal output by the gesture sensor 107. Below, "detecting a hand of the user" and "detecting a finger" are both used.

A recognition unit 203 is constituted by the CPU etc., and recognizes gesture operations performed by the user by tracking the hand and fingers of the user detected by the gesture sensor 107 and the detection unit 202. An identification unit 204 is constituted by the CPU etc., and identifies which finger of the user executed an operation that was recognized by the recognition unit 203. A holding unit 205 is constituted by the CPU etc., and stores information regarding the object that the user has designated from out of the objects included in the projected electronic data with a gesture operation, in association with the finger used for the gesture operation in the storage area provided in the RAM 103. A receiver unit 206 is constituted by the CPU etc., and receives an editing operation designated with respect to the electronic data made using the gesture operation recognized by the recognition unit 203, and updates the electronic data stored in the storage apparatus 104 as needed. The storage apparatus 104 stores electronic data that is to undergo the editing operation. The CPU 101 references information held by the holding unit 205 in accordance with the gesture recognized by the recognition unit 203, and generates a projection image to be projected into the work space. The projector 106 projects the projection video generated by the CPU 101 into the work space that includes the projection surface 110 and the hand of the user in the vicinity of the projection surface.

Figure 2:
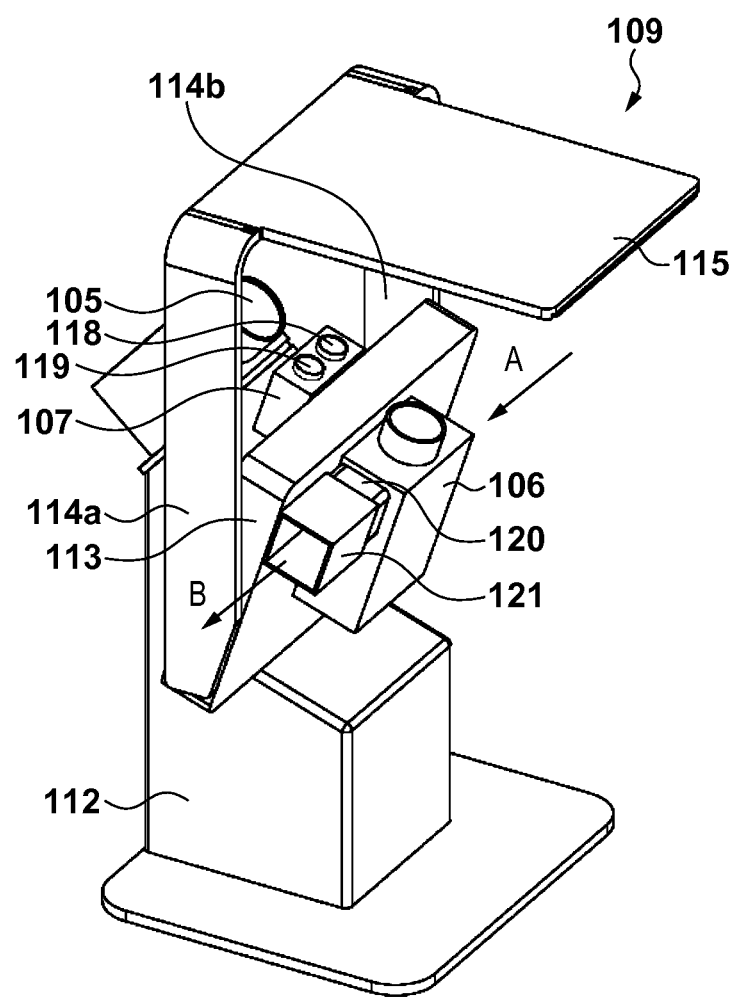
FIG. 2 is a perspective view showing the configuration of the information processing apparatus according the first embodiment.
Figure 3:
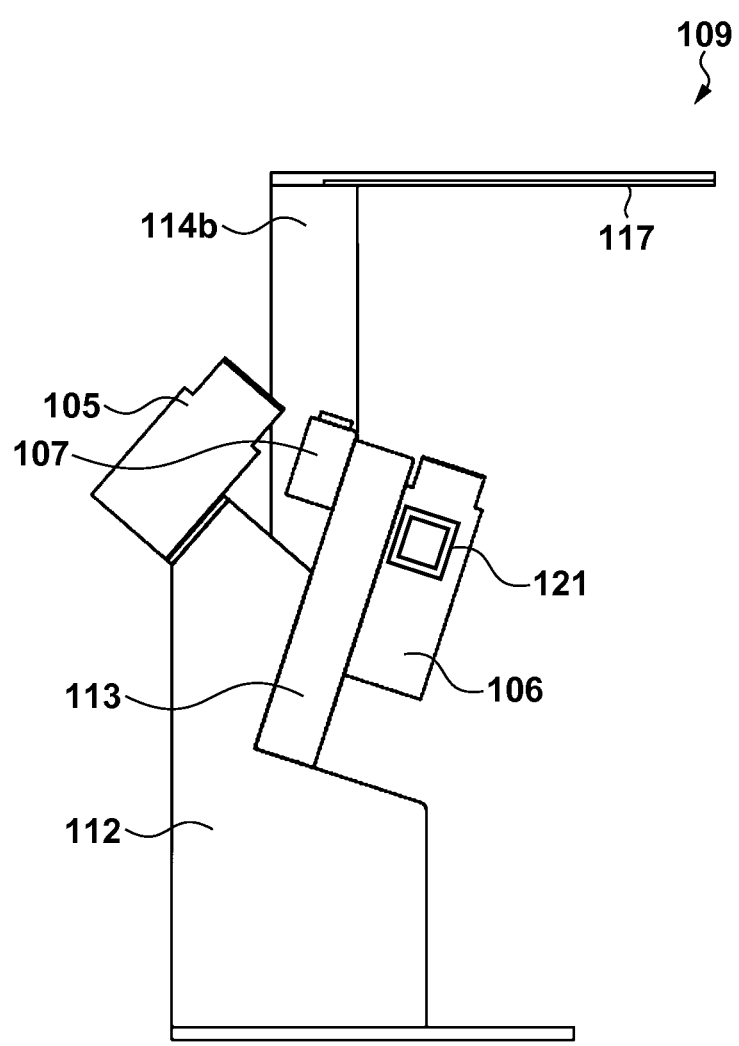
FIG. 3 is a side view of the information processing apparatus according the first embodiment.

FIG. 2 is an external perspective view showing the configuration of the information processing apparatus 109 according to the present embodiment, and FIG. 3 is a side cross-sectional view of the information processing apparatus 109. In FIGS. 2 and 3, the camera 105 and a main frame 113 are fixed to a stand 112. The camera 105 is arranged such that its optical axis is obliquely upward relative to the horizontal plane. The main frame 113 supports the projector 106 and the gesture sensor 107 respectively on the top side and on the bottom side. A gesture sensor light emitting unit 118 and a gesture sensor light receiving unit 119 are arranged in the gesture sensor 107. The projector 106 and the gesture sensor 107 are arranged such that the optical axes of the light emitting unit 118 and the light receiving unit 119 are obliquely upward relative to the horizontal plane.

The main frame 113 horizontally supports a mirror unit 115 in the upper portion of the mainframe 113 via side frames (support members) 114a and 114b. A mirror 117 is attached to the bottom surface of the mirror unit 115. The mirror 117 is a flat mirror. The mirror 117 reflects the light projected from the projector 106 downward. The image projected by the projector 106 is projected onto the projection surface 110 via the mirror 117. Also, the mirror 117 is also used in image capturing by the camera 105 and detection by the gesture sensor 107. Specifically, the camera 105 captures, via the mirror 117, an image of the subject placed on the projection surface 110 and an image of the image projected onto the projection surface. The gesture sensor 107 detects the subject (hand of the user or the like) in the vicinity of the projection surface via the mirror. A fan 120 and a duct 121 for cooling the projector 106 are provided on the main frame 113. The projector 106 intakes air from a direction A using the fan 120 and discharges it in a direction B. The camera 105 and the gesture sensor 107 are provided on the side opposite to the projector 106 with respect to the main frame 113 that supports the projector 106. This configuration makes it possible to prevent heat from the projector 106, which is a heat generator, from having an influence in terms of optical performance on the camera 105 and the gesture sensor 107, by shielding (insulating) the projector 106 from the camera 105 and the gesture sensor 107 using the main frame 113. As shown in FIG. 3, heat generated by the projector 106, which is a heat source, is blocked by the main frame 113, and is discharged in a direction toward the front of the paper via the duct 121 without moving in the direction of the camera 105 and the gesture sensor 107.

Figure 4:
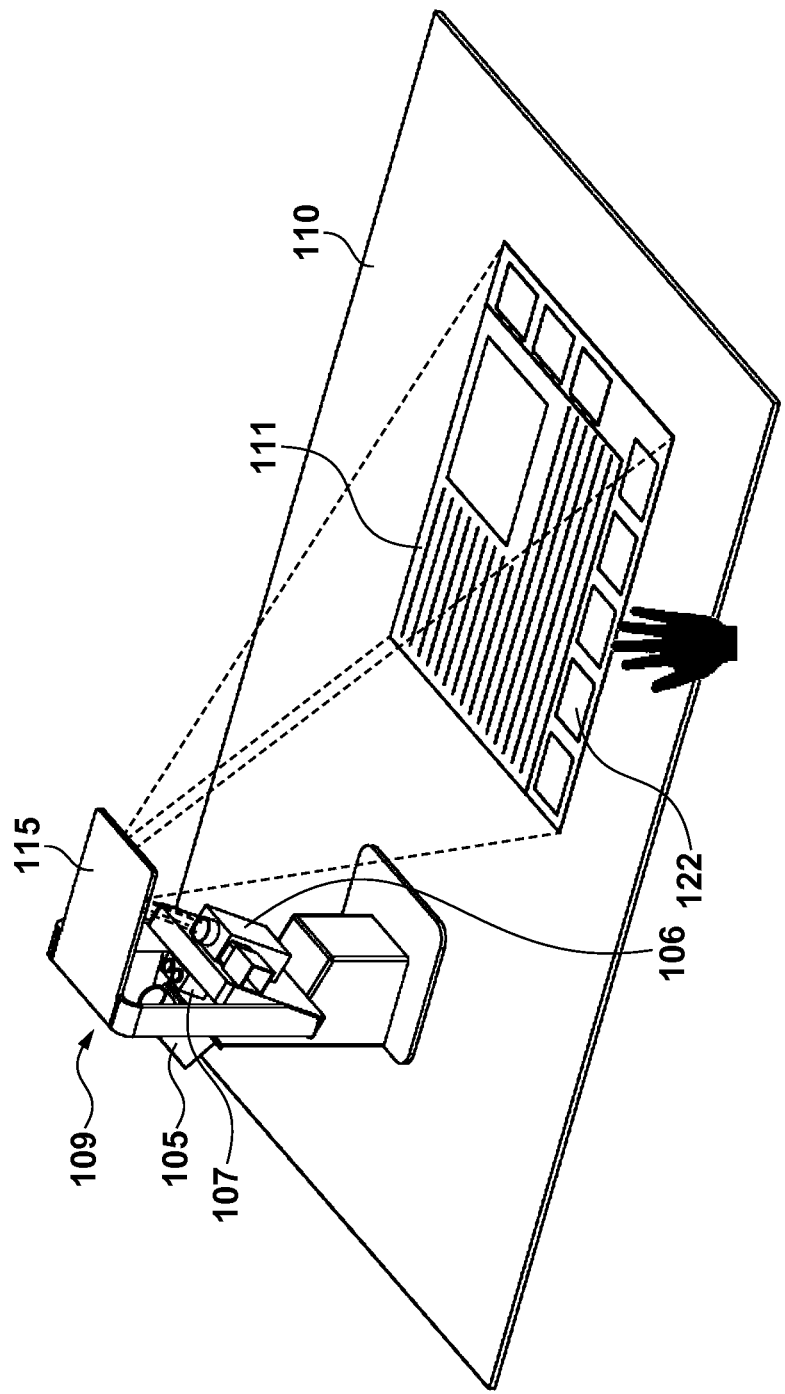
FIG. 4 is a schematic view showing the information processing apparatus according to the first embodiment in a state of use.

FIG. 4 is a diagram showing the information processing apparatus 109 according to the present embodiment in a state of being used. First, projection will be described. The projector 106 of the information processing apparatus 109 performs projection facing obliquely upward, and the light beam reflected by the mirror unit 115 forms an electronic data image 111 on the projection surface 110. The user performs operations on the electronic data image 111. A menu button 122 is included in the projected electronic data image 111, and the user uses their finger to turn power ON or OFF and to select other operations. This selection operation is detected by the gesture sensor 107, and the electronic data image 111 functions as an interface.

Next, image capturing will be described. A subject (a document or the like) of which an image is to be captured is arranged on the projection surface 110 when image capturing is to be performed. Then, a reflection image that appears on the mirror unit 115 is captured by the camera 105.

Next, detection using the gesture sensor 107 will be described. Infrared light is emitted by the gesture sensor light emitting unit 118, the light beam reflected by the mirror unit 115 is reflected by a subject (a finger or the like) on the projection surface 110, the light beam is reflected again by the mirror unit 115, and is then detected by the gesture sensor light receiving unit 119.

Stray Light from Projector 106

As described above, the light beam projected by the projector 106 is reflected by the mirror unit 115 and projected onto the projection surface 110. However, a portion of the light beam undergoes irregular reflection in the projector 106 and becomes stray light 160 that is projected onto locations other than the projection surface 110 (see FIG. 5).

Figure 5:
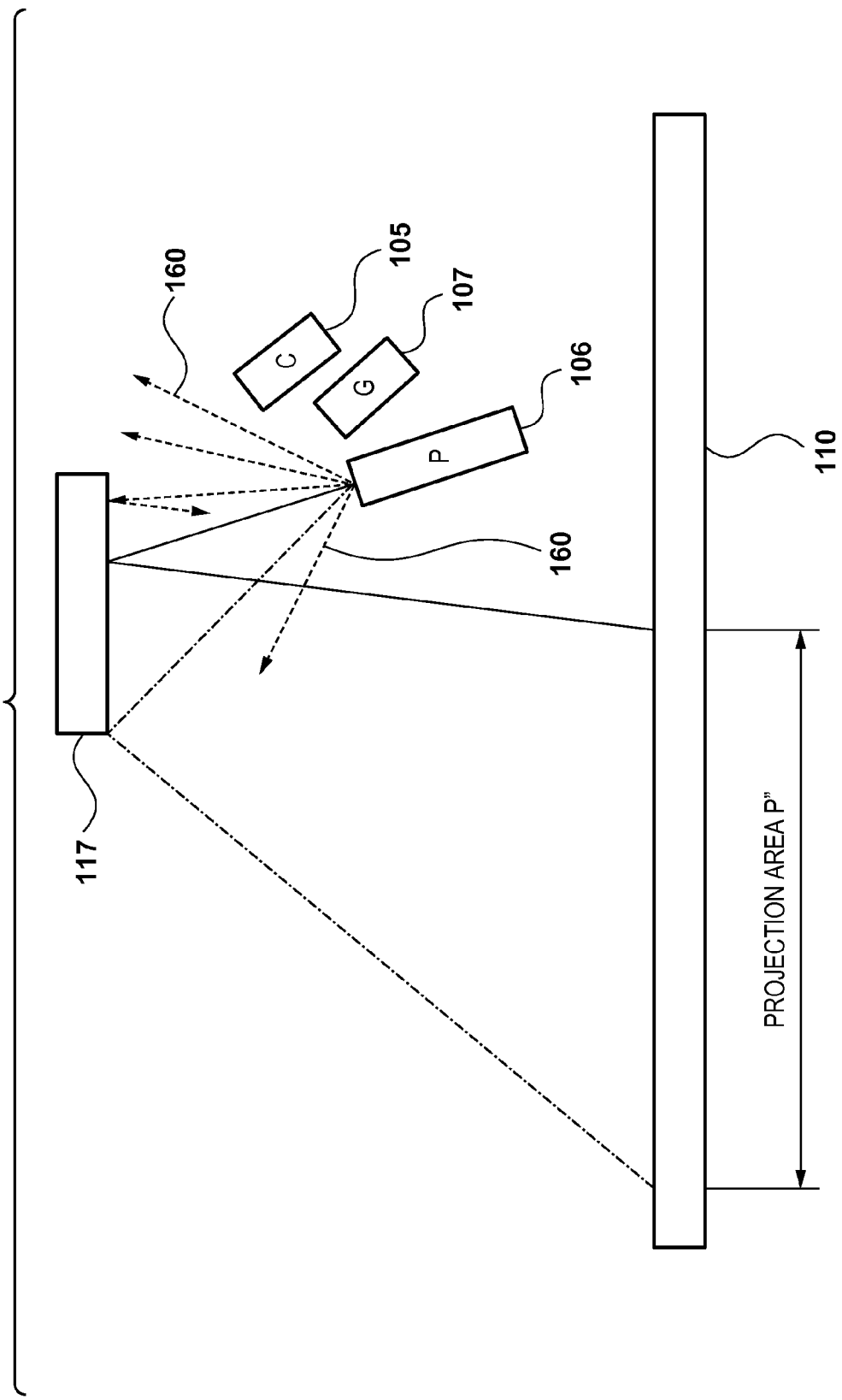
FIG. 5 is a side view illustrating an optical path of a projector of the information processing apparatus according to the first embodiment.

FIG. 5 is a side view illustrating the optical path of the projector of the information processing apparatus according to the first embodiment. The projector 106 and the camera 105 are arranged below the mirror 117. The light beam projected by the projector 106 is reflected by the mirror 117 and projected onto the projection surface 110. At this time, a portion of the light beam does not move toward the mirror 117 and becomes the stray light 160 due to reflection and refraction in the projector 106.

A large portion of the stray light 160 passes through the portion that does not have the mirror 117 and attenuates due to colliding with the exterior facing and other components, and therefore does not enter the camera 105 and does not influence image capturing by the camera 105. A portion of the stray light 160 is reflected by the mirror 117, but the component reflected in the direction of the camera 105 is an irregular reflection component that is very minute. For this reason, imaging by the camera 105 is not influenced.

Figure 6:
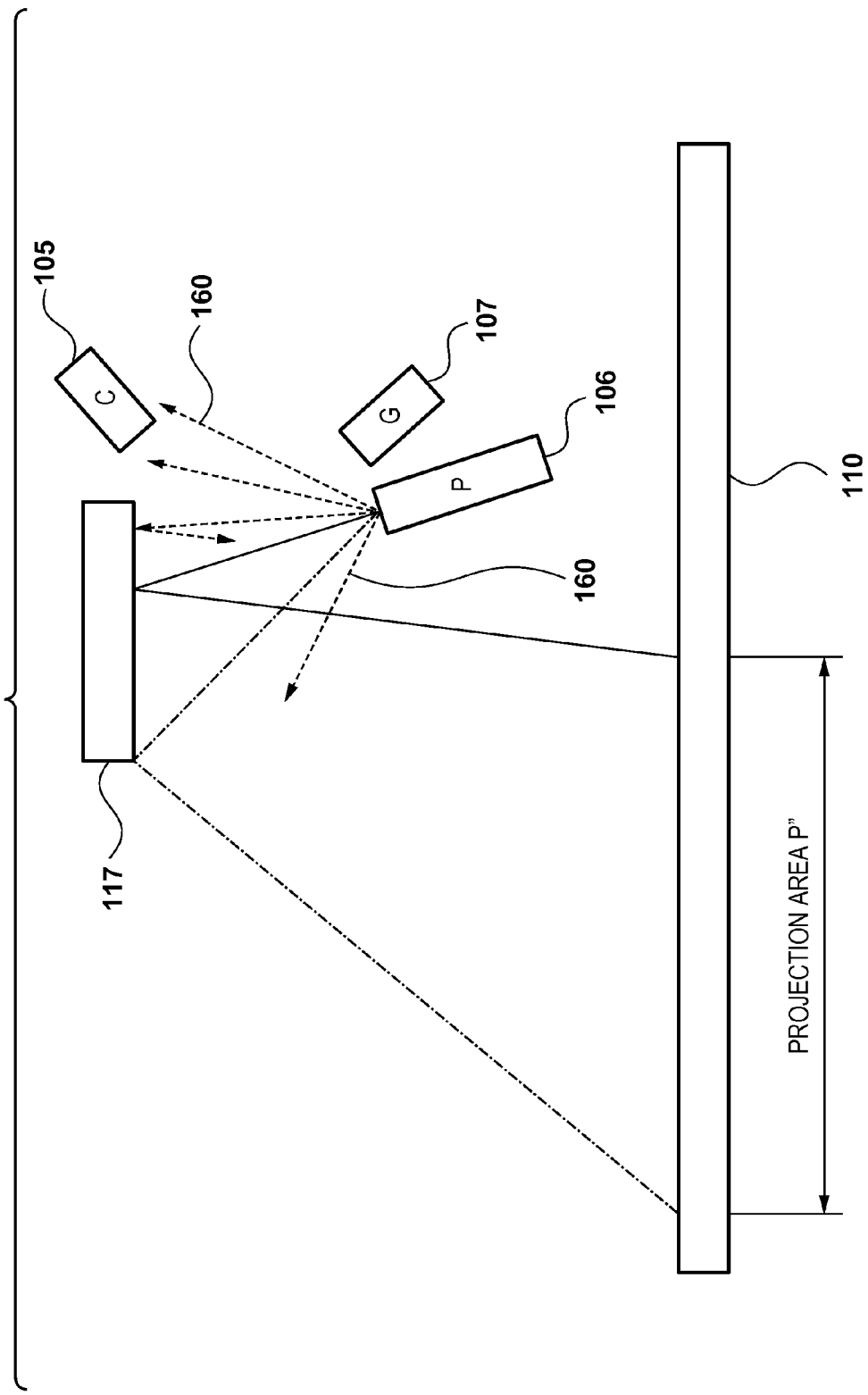
FIG. 6 is a side view illustrating an optical path of a projector of an information processing apparatus that does not use an image capturing mirror.

Next, FIG. 6 is a side view illustrating the optical path of a projector of an information processing apparatus that does not use a mirror during image capturing. The projector 106 is arranged below the mirror 117. This shows a configuration in which the camera 105 is arranged above the mirror 117, and the mirror 117 is not used during image capturing. The light beam projected by the projector 106 is reflected by the mirror and projected onto the projection surface 110. At this time, a portion of the light beam becomes the stray light 160 and is projected into the camera 105. The stray light 160 that has entered the camera 105 is repeatedly reflected and refracted and is projected onto the image capturing element. As a result of this, an image defect occurs as a flare during image capturing using the camera 105.

As described above, the configuration of the first embodiment is different from the configuration shown in FIG. 6, and is a configuration in which image defects due to the stray light 160 due to the projector 106 are not likely to occur.

Figure 7:
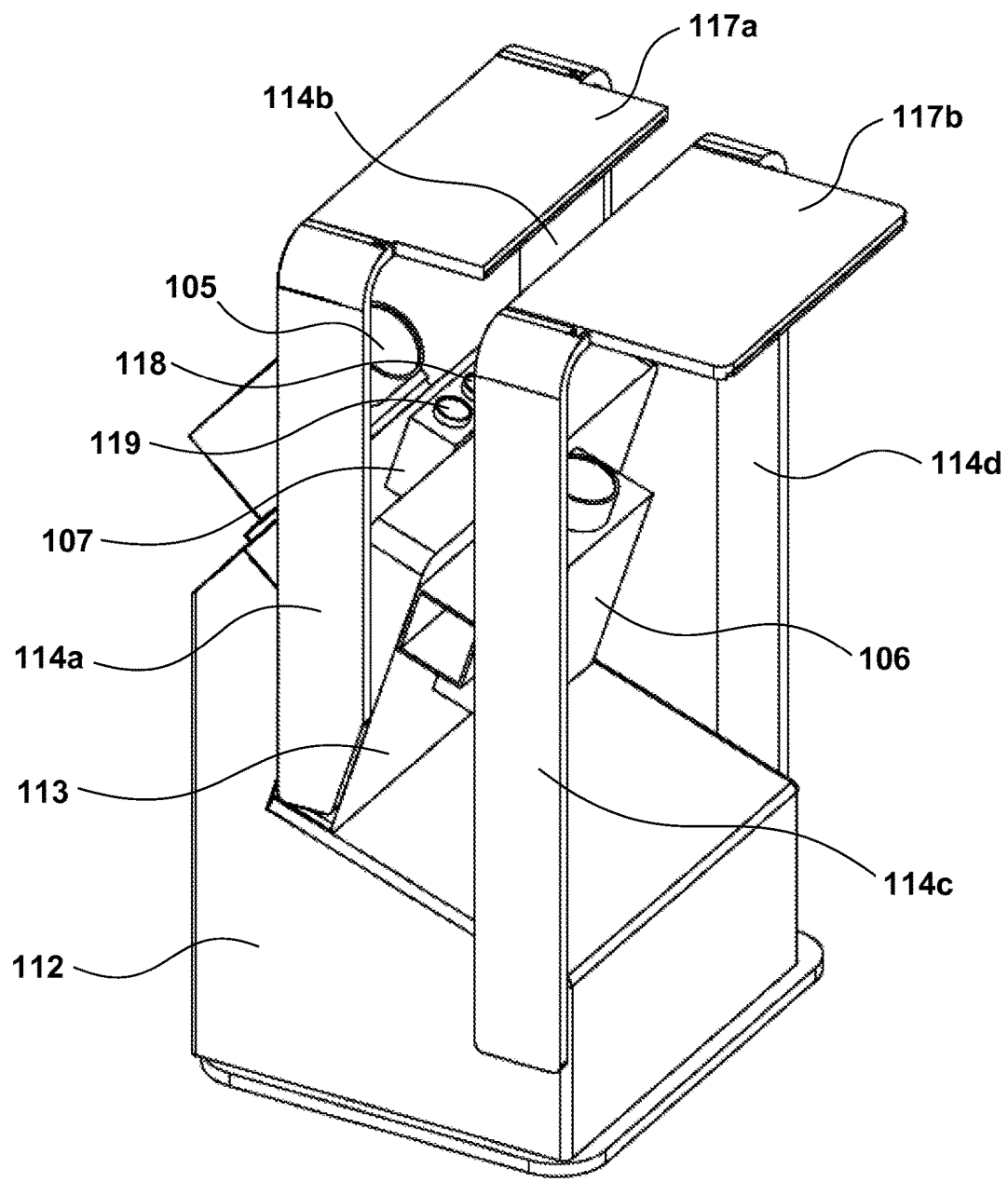
FIG. 7 is a perspective view showing a configuration of an information processing apparatus that has a projection mirror and an image capturing mirror.

Also, in the first embodiment, the mirror 117 (the reflection mirror) is a single mirror that functions to reflect both the light beam projected by the projector 106 and the light beam to be imaged by the camera 105, but a separate mirror may be used for each light beam. FIG. 7 is a perspective view showing the configuration of an information processing apparatus that has a separate projection mirror and an image capturing mirror.

A projection mirror 117b is attached to the upper portion of the main frame 113 via side frames (supporting members) 114c and 114d. The projection mirror 117b reflects the light projected by the projector 106 downward. An image capturing mirror 117a is attached to the upper portion of the main frame 113 via side frames (supporting members) 114a and 114b. The camera 105 captures images, via the image capturing mirror 117a, of the subject placed on the projection surface 110 that is reflected along the image capturing optical path, and of the image projected onto the projection surface.

Even in such a configuration that has the projection mirror 117b and the image capturing mirror 117a, a large portion of the stray light 160 passes through the portion that does not have the mirror 117, and therefore does not enter the camera 105, and does not influence image capturing by the camera 105. A portion of the stray light 160 is reflected by the mirrors 117a and 117b, but the component reflected in the direction of the camera 105 is an irregular reflection component that is very minute. For this reason, imaging by the camera 105 is not influenced.

As described above, in the first embodiment, the same mirror unit 115 is used to reflect downward for projection, imaging, and gesture detection, and therefore the camera 105, the projector 106, and the gesture sensor 107 can be arranged below the information processing apparatus 109. For this reason, the overall height of the information processing apparatus 109 decreases, and the natural frequency of the main body of the apparatus increases, and therefore it is possible to mitigate influence on the camera 105, the projector 106, and the gesture sensor 107 by force from the outside in the installation environment and vibration generated by the main body of the apparatus.

On the other hand, the mirror 117 is arranged above the information processing apparatus 109, and therefore the natural frequency is low, and vibration is likely to be weak. However, depending on the vibration mode of the vibration of the mirror 117, there are large and small influences on the function of the information processing apparatus 109 (projection, imaging, and the position precision in gesture detection).

Figure 8:
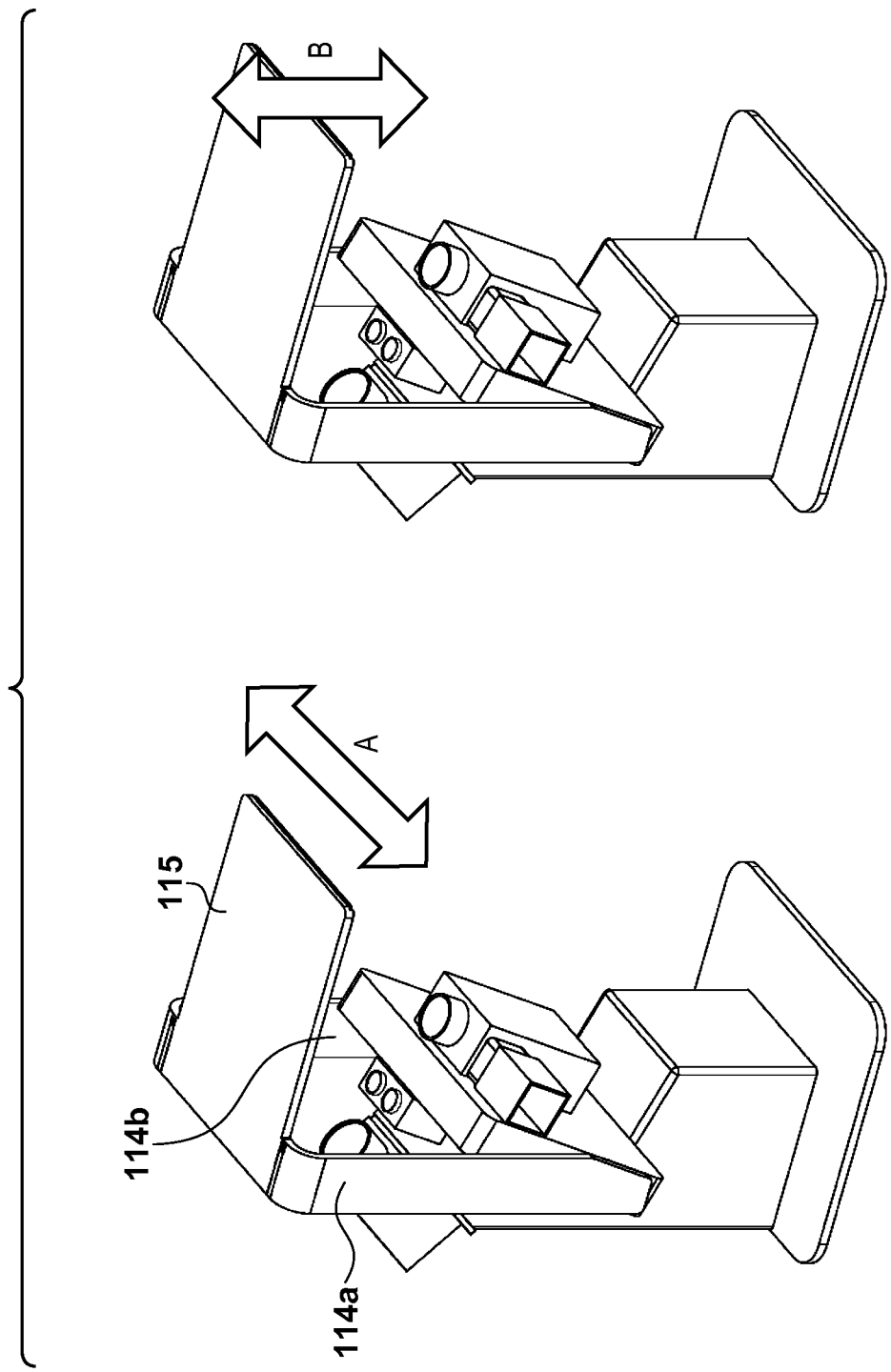
FIG. 8 is a diagram showing vibration modes of the information processing apparatus according to the first embodiment.

FIG. 8 is a schematic diagram showing vibration modes of the information processing apparatus 109 according to the present embodiment. Vibration in the plane of the mirror 117 (vibration in the direction A) does not influence the reflected light, and therefore there are no cases in which vibration in the plane of the mirror 117 influences projection, imaging, and the position precision in gesture recognition. On the other hand, rough vibration (vibration in the direction B) in the vertical direction of the mirror 117 causes the path of the reflected light to change, and therefore there is a risk that the vibration will lead to vibrating of the projection image, blurring of the captured image, incorrect detection in gesture detection, or the like.

Thus, in the present embodiment, vibration in the direction B is made less likely to occur by employing a configuration in which the natural frequency of vibration in the direction A is set lower than the natural frequency of the vibration in the direction B. In other words, if the natural frequency in the direction A is low and vibration is likely to occur, the energy of the vibration is absorbed by the vibration in the direction A, thus making it difficult for vibration to occur in the direction B. Specifically, the cross-sectional shape that is perpendicular to the vertical direction of side frames 148a and 148b is a rectangular shape (52 mm×8 mm), and thus the natural frequency in the direction A is set lower than the natural frequency of the vibrations in the direction B.

In the present embodiment, design is performed so that the natural frequency in the direction A is 48 Hz, and the natural frequency in the direction B is 58 Hz. Specifically, the natural frequency in the direction A can be made smaller than the natural frequency in the direction B by forming the side frames such that the second moment of area of the arm in the direction perpendicular to the direction A is larger than the second moment of area of the arm in the direction A.

Figure 9A:
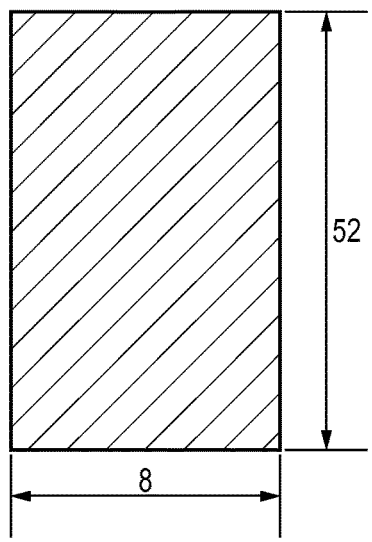
FIGS. 9A to 9D are diagrams showing a cross-sectional shape of a side frame.

FIG. 9A shows a cross-section of the arm in the present embodiment. The second moment of area I is expressed with the following formula (b: width, h: height).

$$I=bh^3/12$$

The direction A has a width of 52 mm and a height of 8 mm when a second moment of area is being calculated for the direction A. Accordingly, the formula is:

$$I=52\times8^3/12=2218$$

and, the second moment of area I=0.22 (cm$^4$).

Also, a width of 8 mm and a height of 52 mm applies for the second moment of area that is perpendicular to the direction A, and therefore the formula is:

$$I=8\times52^3/12=93739$$

the second moment of area I=9.4 (cm$^4$).

Note that here, if one arm is formed at an arbitrary position in the direction A, the vibration of the mirror is not parallel, but instead has a rotational component, and the path of the reflected light is changed. Accordingly, there is a need to provide at least two or more arms at arbitrary positions in the direction A. Furthermore, in the present embodiment, the arms are formed with a rectangular shape, but the arms are not limited to having a rectangular shape as long as the relation between the second moments of area is the same.

Figure 9B:
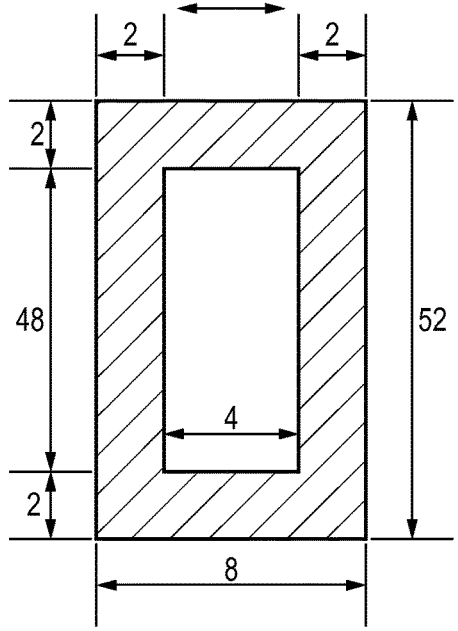
Figure 9C:
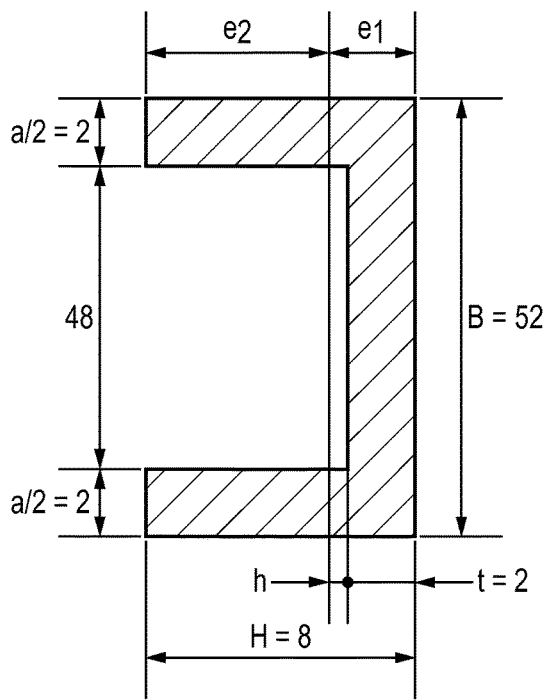
Figure 9D:
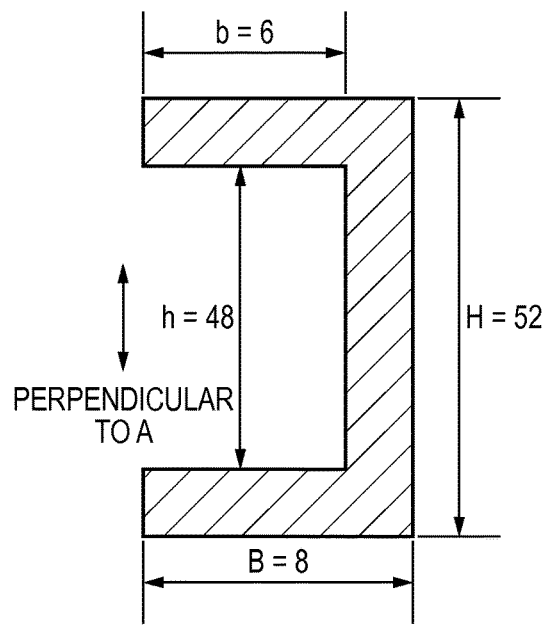

FIGS. 9B to 9D show cross-sections in cases in which the arm has different shapes. FIG. 9B is a cross-sectional view in the case in which a hollow rectangular pipe is formed. In the case of obtaining a second moment of area in the direction A assuming the hollow rectangular pipe has an external shape of 8 mm×52 mm and has a thickness of 2 mm, the dimensions are width b=52, height h=8, gap width b1=48, and gap height h=4.

The second moment of area I is expressed with the following formula (b: width, h: height).

$$I=(bh^3-b1h1^3)/12$$

Accordingly the formula becomes, $$I=(52\times8^3-48\times4^3)/12=1962$$

and, the second moment of area I=0.20 (cm$^4$).

Similarly, the direction perpendicular to the direction A is:

$$I=(8\times52^3-4\times48^3)/12=56875$$

and, the second moment of area I=5.7 (cm$^4$).

FIGS. 9C and 9D are cross-sectional diagrams of a U-shaped arm. Letting the external shape be 8 mm×52 mm, and the thickness be 2 mm, in a case in which the second moment of area in the direction A is obtained, the dimensions shown in FIG. 9C apply. First, $$e1=(aH^2+bt^2)/(2(aH+bt))$$

and therefore, $$e1=(4\times8^2+48\times2^2)/(2\times(4\times8+48\times2))=1.75$$

and next, $$e2=H-e1=8-1.75=6.25$$

$$h=e1-t=1.75-2=-0.25$$

applies.

The second moment of area is expressed with the following formula:

$$I=(Be1^3-bh+ae2^3)/3$$

and therefore, $$I=(52\times1.75^3-48\times(-0.25)+4\times6.25^3)/3=419$$

applies, and the second moment of area I=0.04 (cm$^4$).

The dimensions shown in FIG. 9D apply in the case of obtaining the second moment of area in the direction perpendicular to the direction A.
Here, $$I=(BH^3-bh^3)/12$$

applies, and therefore, $$I=(8\times52^3-6\times48^3)/12=38442$$

applies, and the second moment of area is 3.8 (cm$^4$).

Next, a method for determining the size of the mirror 117 will be described. The mirror 117 is arranged above the information processing apparatus and is easily influenced by vibration, and therefore it is desirable to reduce the size and the weight of the mirror 117 as much as possible to increase the natural frequency. In order to reduce the size of the mirror 117, the camera 105, the projector 106, and the gesture sensor 107 are required to be optimally arranged.

Figure 11:
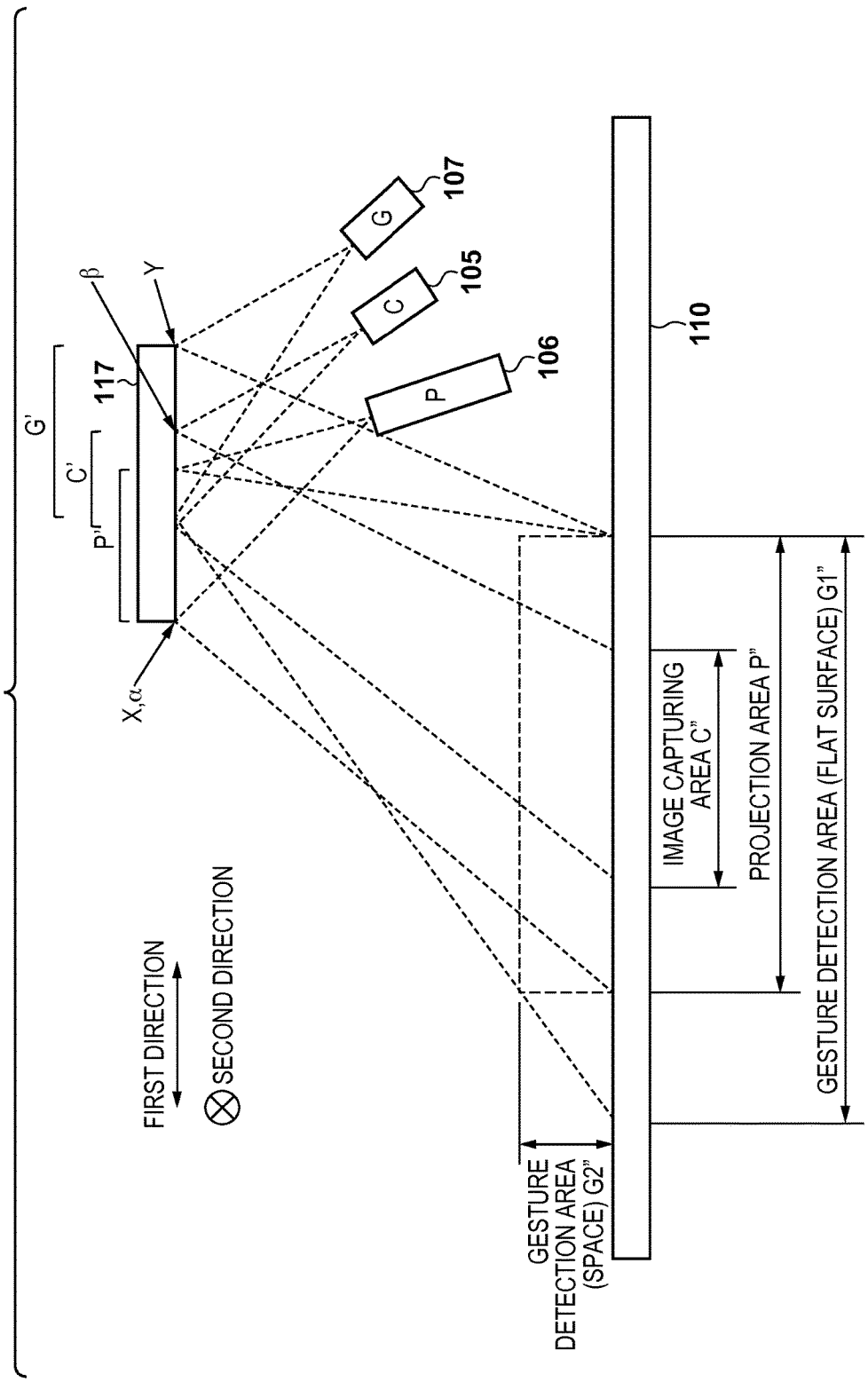
FIG. 11 is a side view showing an optical path in a case in which an arrangement of a camera and a gesture sensor is reversed.

FIG. 10 is a side view illustrating the optical path of the information processing apparatus 109 according to the present embodiment. FIG. 11 is a side view showing the optical path of the information processing apparatus 109 as a comparative example. FIGS. 10 and 11 are cross-sections taken along optical axes of the camera 105, the projector 106, and the gesture sensor 107. Note that in the following description, a virtual optical axis of the gesture sensor 107 is emitted from a point between the light emitting unit 118 and the light receiving unit 119.

Figure 12:
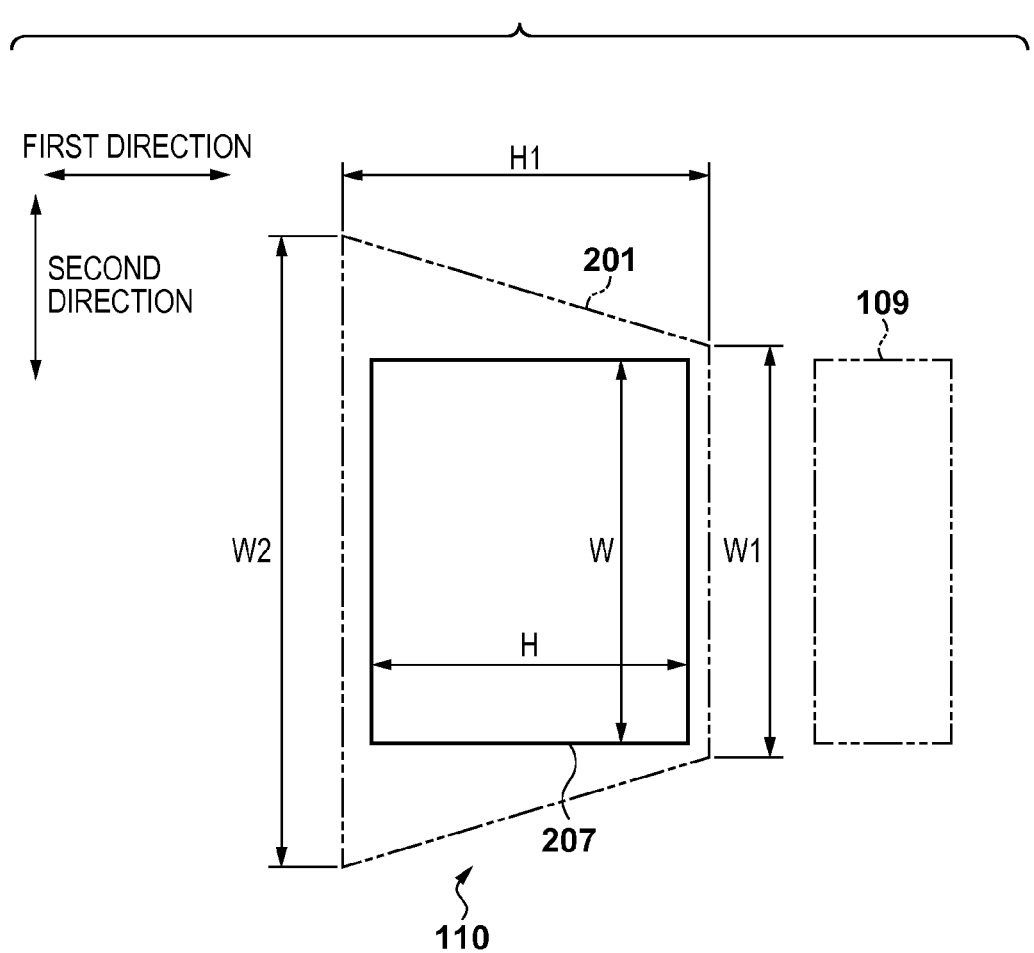
FIG. 12 is a diagram showing a projection area in a state when viewed facing the projection surface.
Figure 13:
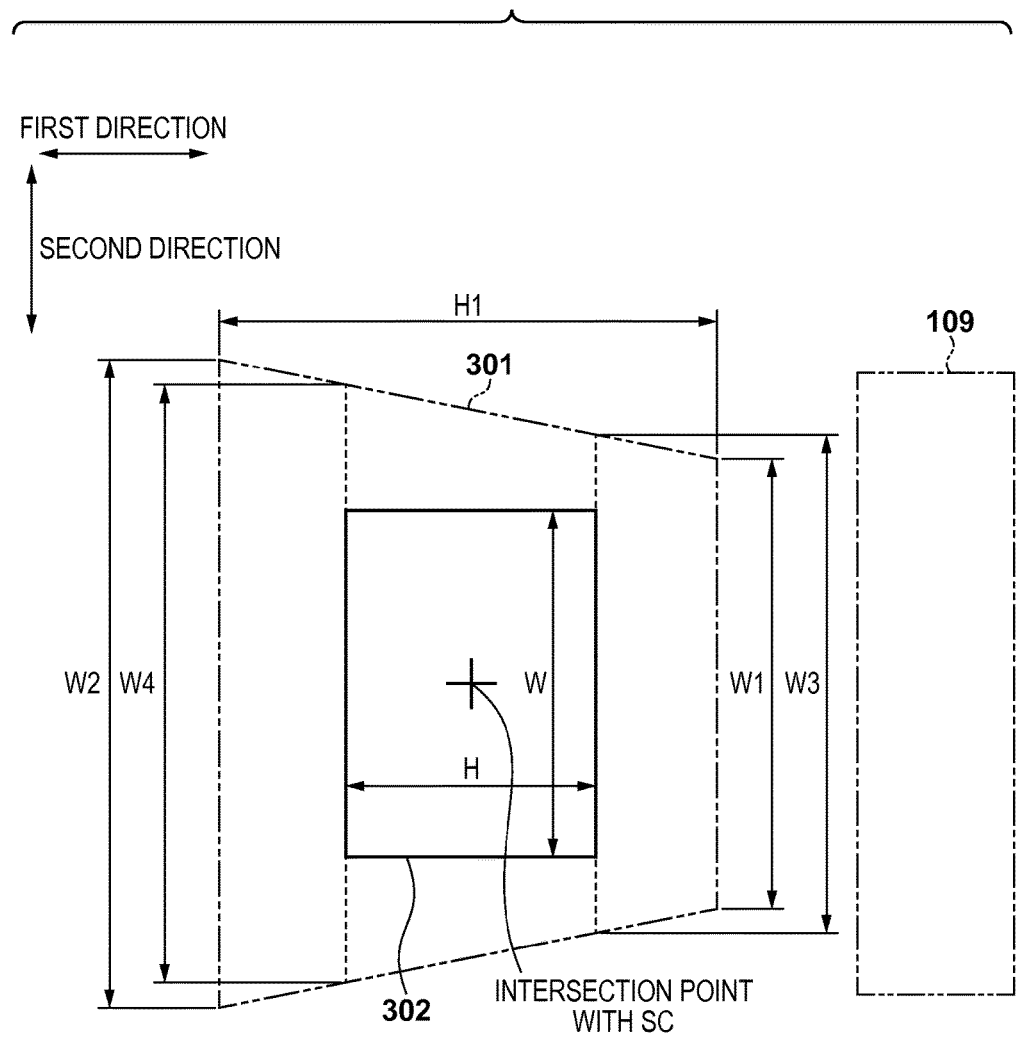
FIG. 13 is a diagram showing the image capturing area when viewed facing the projection surface.

In FIG. 10, the direction of the optical axis of the camera 105 during projection onto the projection surface 110 is a first direction (the horizontal direction in FIGS. 10 and 11), and a direction that is orthogonal to the first direction is a second direction (the direction perpendicular to the paper sheet of FIGS. 10 and 11). Specifically, FIGS. 10 and 11 are diagrams viewed in the second direction. Note that FIGS. 12 and 13 are diagrams viewed in a direction that is perpendicular to the projection surface, and in FIGS. 12 and 13, the first direction is a direction H and the second direction is a direction W.

Figure 15:
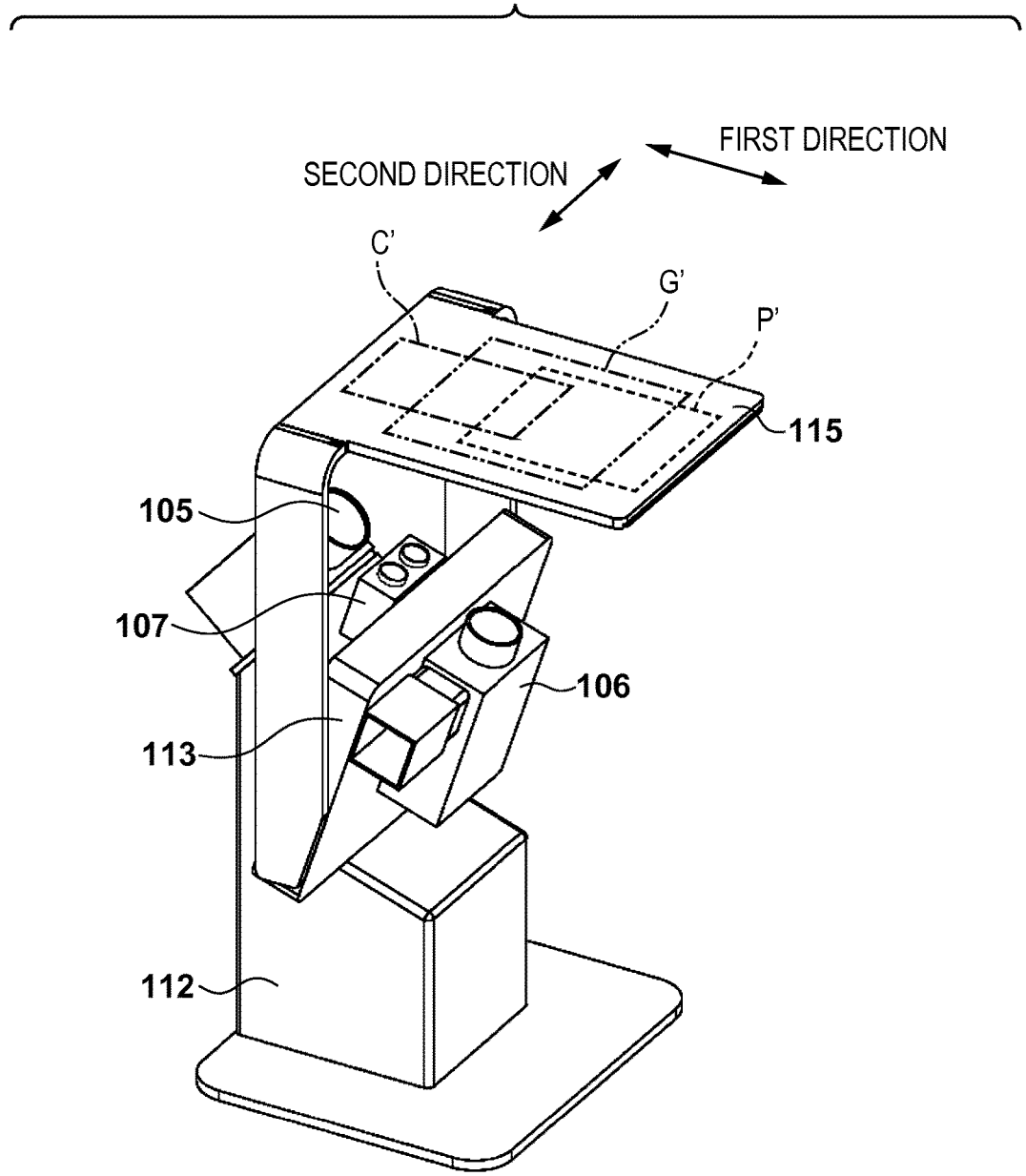
FIG. 15 is a diagram illustrating usage areas of the mirror.

FIG. 15 is a perspective view of the information processing apparatus 109 for illustrating the usage areas of the mirror. In the present embodiment, the first direction is the longitudinal direction of the mirror 117, and the second direction is the short direction of the mirror 117.

In FIG. 10, the dashed line extending from the projector 106 indicates the projection luminous flux of the projector, and the solid line indicates the optical axis of the projector. In the present embodiment, the projector 106 only uses one side of light with respect to the optical axis for projection. For this reason, the luminous flux on the camera side of the projector 106 matches the optical axis of the projector 106, and is therefore indicated with a solid line. The projector 106 is provided with an LCD panel as a light modulation element. The projection luminous flux emitted by the LCD panel of the projector 106 gradually expands and is reflected by the mirror 117. The projection luminous flux that has been reflected forms a projection image in the projection area of the projection surface 110. In other words, the area is an area in which a shadow is formed on the projection image if a light blocking object is inserted into a portion of this luminous flux.

The two dashed lines extending from the camera 105 indicate imaging luminous flux of the camera 105, and the solid line indicates the optical axis of the camera. An original is placed in the image capturing area on the projection surface 110 and faces a group of lenses of the camera 105, which are not shown, light is gradually converged via the mirror 117, light passes though the group of lenses, and an image is formed on an image capturing element of the camera 105. In other words, the area is an area in which imaging is performed with an object entering the image capturing area, if an object is inserted into a portion of this luminous flux.

The two dashed lines extending from the gesture sensor 107 indicate the detection luminous flux of the gesture sensor, and the solid line indicates the optical axis of the gesture sensor. If an object is inserted into a portion of this luminous flux, the gesture sensor 107 can detect the detection target.

Optical Path Length of Camera 105 and Projector 106

In the case in which the captured image is that of an original such as a document, a deep depth of field is required in order to correctly read the characters and the like in the entire region of the captured image. This necessity increases even further in the case in which Optical Character Reader (OCR) processing is to be performed on the captured image. For this reason, there is a need to make the optical path length of the camera 105 longer than that of the projector 106, and obtain a deep depth of field.

In FIG. 10, the image capturing element of the camera 105 captures an image so that the image is symmetrical with respect to an optical axis, like a general camera. Let the beam of light projected along the lens optical axis be SC. The optical path length of the light beam SC is the length of the light beam SC from the projection surface 110 to the image capturing element. If the length of the light beam SC from the projection surface 110 to the mirror 117 and the length of the light beam SC from the mirror 117 to the image capturing element are combined, the length is 950 mm in the present example.

On the other hand, in FIG. 10, the projector 106 performs projection such that an image is only projected onto one side with respect to the optical axis of the lens, like a general projector. Let the light beam projected along the lens optical axis be SP. The optical path length of the light beam SP is the length of the light beam SP from the projection surface 110 to the LCD panel, which is the image forming surface. If the length of the light beam SP from the projection surface 110 to the mirror 117 and the length of the light beam SP from the mirror 117 to the LCD panel are combined, the length is 827.2 mm in the present example.

The light modulation element is not limited to an LCD panel, and a digital micro-mirror device (DMD) or the like can be used. In the case in which a DMD is used, the optical path length is the distance from the projection surface 110 to the surface of the DMD, which is the image forming surface.

As described above, by making the optical path length of the camera 105 longer than the optical path length of the projector 106, it is possible to deepen the depth of field of the camera 105 and support captured images such as images of a document that requires OCR.

There is a projection area P''', an image capturing area C''', and a gesture detection area (flat surface) G1''' on the projection surface 110. The size relationship between the areas on the projection surface 110 is generally set as described below in light of usage applications by the user.

image capturing area C'''<=projection area P'''<gesture detection area (flat surface) G1'''

Next, this relationship will be described.

The camera 105 captures images of text hand written by the user or the like. A configuration is possible in which it is possible for imaging by the camera to capture an image of the entirety of the area projected by the projector, or to capture an image of a portion of the area projected by the projector.

Also, in the case in which operations are performed by gestures made by the user with respect to an image projected onto the projection surface 110, it is conceivable that operations are performed at a position above the projection surface 110. Accordingly, gesture detection is possible in the projection area P''' (the gesture detection area (space) G2''') at a position above the projection surface 110 (a position with a height of 100 mm in the present embodiment). For this reason, the gesture detection area G1''' on the projection surface 110 is bigger than the projection area P'''. The projector 106 is arranged the nearest with respect to the projection area P'''. This is to bring the angle of incidence of a light beam projected by the projector 106 onto the projection surface 110 to a state near as possible to being perpendicular with respect to the projection surface in order to increase the resolution of the projection image as much as possible. Generally, the resolution of the projector 106 tends to be lower than the resolution of the camera 105 and the gesture sensor 107 in terms of device performance. For this reason, this arrangement has been performed to maintain the resolution of the projector 106, which is the most likely to undergo a decrease in resolution. Then, the camera 105 is arranged on the outside of the projector 106.

The gesture sensor 107 is arranged in a virtual triangle 208 formed by the optical path on the camera side (image capturing unit side) of the luminous flux of the projector 106 (the rightward solid line extending from the projector 106 in FIG. 10), the optical path on the projector side (projection unit side) of the luminous flux of the camera 105 (the leftward dashed line and dashed dotted line extending from the camera 105 in FIG. 10), and the projection surface 110.

The size of the mirror 117 in this case will be described. The size of the mirror 117 is required to be a size that fills the projection area P''', the image capturing area C'', the gesture detection area (plane) G1'', and the gesture detection area (space) G2''. The areas required on the mirror 117 are an image capturing area C', a projection use area P', and a gesture detection use area G'. Because the image capturing use area C' and the projection use area P' are configured to overlap, the size of the mirror 117 can be reduced compared to the case in which the image capturing use area C' and the projection use area P' are configured to be separate areas. At this time, in the first direction, the projection area P''' and the nearest point X in the mirror 117 are determined by the projection use area P' that is the optical path of the projector 106. Also, in the first direction, the projection area P''' and the furthest point Y in the mirror 117 are determined by the image capturing use area C' that is the optical path of the camera 105. Then, a gesture detection use area G' becomes the widest area, and is thus arranged between the projection use area P' and the image capturing use area C'. Assuming that, out of the image capturing use area C' and the projection use area P', a point on a side near the projection surface on which the projection area P''' is formed is α, and a point on the side far from the projection surface is β, the gesture detection use area G' is to be contained between α and β. Note that in FIG. 10, α and X are the same location, and β and Y are the same location. In doing so, in the first direction (the horizontal direction of FIG. 10), the gesture detection use area G' is contained in the image capturing use area C' and the projection use area P'. Accordingly, usage areas of the mirror 117 at least partially overlap, and thus the size of the mirror 117 can be reduced as much as possible in the first direction.

Figure 16:
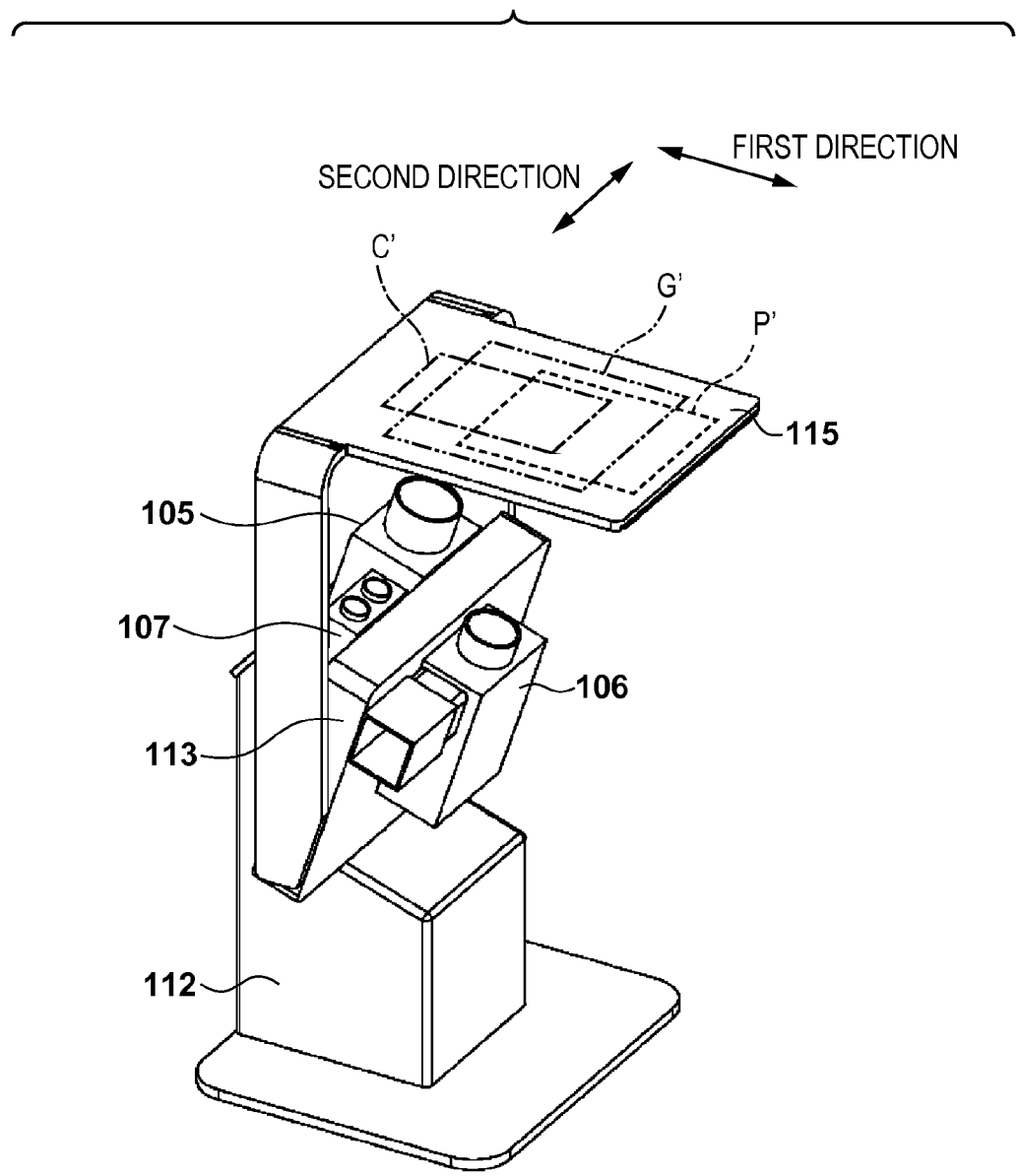
FIG. 16 is a diagram illustrating usage areas of the mirror in a configuration different from FIG. 15.

Note that FIG. 10 illustrates an example in which the optical axes of the camera 105, the projector 106, and the gesture sensor 107 are approximately on the same plane, but there is no limitation to this. As shown in FIG. 16, the camera 105 and the gesture sensor 107 may be arranged side by side. Even if such a configuration is employed, the size of the mirror 117 can be reduced by configuring the image capturing use area C' and projection use area P' to overlap. Also, the size of the mirror 117 can be reduced by employing a configuration in which the gesture detection use area G' is contained in the image capturing use area C' and the projection use area P' in the first direction (the horizontal direction of FIG. 10).

Figure 17:
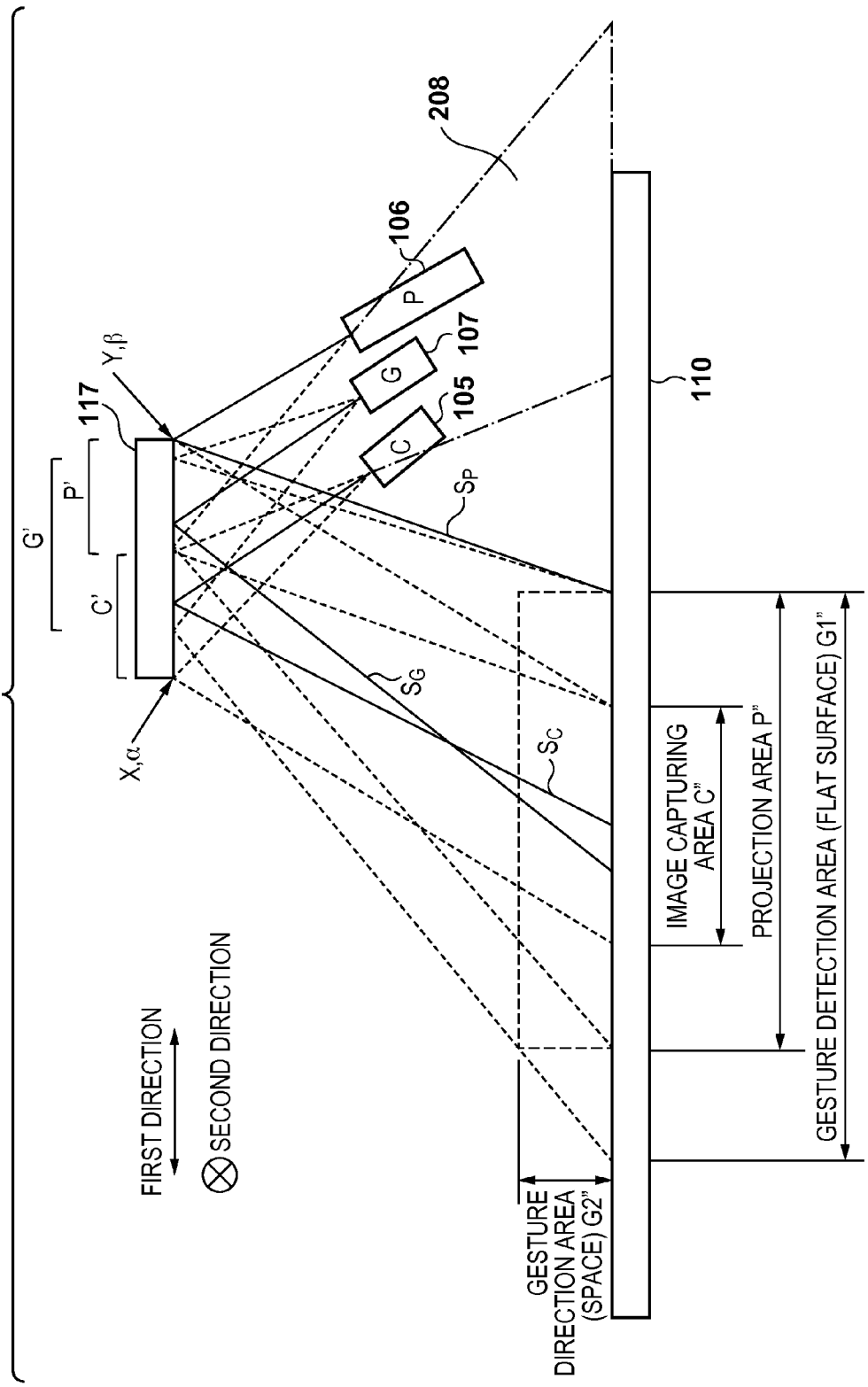
FIG. 17 is a side view showing an example of an information processing apparatus in which a camera is arranged nearer to the projection surface than the projector is.

FIG. 17 is an illustrative diagram of the information processing apparatus 109 in which the camera 105 is arranged nearer to the projection surface 110 than the projector 106 is. In FIG. 10, a configuration is illustrated in which the projector 106 is arranged nearer to the projection surface 110 than the camera 105 is, but a configuration is possible in which the camera 105 is nearer to the projection surface 110 than the projector 106 is, as shown in FIG. 17. In other words, in a view from the second direction, the area of the mirror used by the gesture sensor 107 is contained between the regions used by the projector 106 and the camera 105 (α and β in FIGS. 10 and 17).

On the other hand, the case in which the camera 105 is arranged outward of the projector 106 and the gesture sensor 107 is arranged outward of the camera 105 will be described with reference to FIG. 11. FIG. 11 is a side view showing the optical path in the case in which the arrangement of the camera 105 and the gesture sensor 107 has been reversed. At this time, in the first direction, the projection area P''' and the nearest point X in the mirror 117 are determined by the projection use area P' that is the optical path of the projector 106, which is similar to FIG. 10. On the other hand, in the first direction, the projection area P''' and the furthest point Y in the mirror 117 are determined by the gesture detection use area G' that is the optical path of the gesture sensor 107. The gesture detection area G1'' that is needed for the gesture sensor 107 is larger than the image capturing area C'' that is needed for the camera 105, and therefore the point Y is positioned outward of the point Y in FIG. 10. Specifically, Y exists at a position outward of β. As a result, there is a need to provide the mirror 117 such that it is outward of β in order to obtain the gesture detection use area G', and the size of the mirror 117 increases in the first direction.

Based on the above, arrangement of the camera 105, the projector 106, and the gesture sensor 107 in order to reduce the size of the mirror 117 is the order shown in FIG. 10 in which the projector 106 is nearest to the projection area P''', and then sequentially the gesture sensor 107 and the camera 105.

Note that, as shown in FIG. 10, the projector 106 performs projection, like a general projector, such that an image is only projected onto one side with respect to the optical axis of the lens. Let the light beam projected through an optical axis of a lens be SP. The projector 106 is provided with an LCD panel as a light modulation element, and the resolution (dots) of a projection image is determined by the light modulation element.

The present embodiment is provided with a light modulation element that can display 1280 dots in the second direction (the direction W in FIG. 12) and 800 dots in the first direction (the direction H in FIG. 12). The light modulation element is not limited to an LCD panel and may be a digital micro-mirror device (DMD) or the like. The projector 106 is disposed such that it is nearest to the projection area, along with being disposed so that the angle of the optical axis of the projector 106 relative to the axis perpendicular to the projection surface 110 is as small as possible.

FIG. 12 shows the projection area when viewed facing the projection surface 110. The optical axis of the projector 106 is inclined, and therefore an image 201 projected onto the projection surface takes the shape of a trapezoid. A rectangular shaped image 207 of the projection surface is obtained by processing data of the image to be projected (so-called Keystone correction). In the present embodiment, the necessary image size is W=620 mm and H=460 mm. Accordingly, the image 201 prior to Keystone correction requires a size larger than or equal to 620 mm×460 mm. As shown in FIG. 10, the optical axis SP of the projector 106 is 14° relative to an axis that is perpendicular to the projection surface, and the distance between the projector 106 and the projection surface 110 in the optical axis portion is 700 mm. At this time, the dimensions of the image 201 projected onto the projection surface are therefore W1=620 mm, W2=716 mm, and H1=460 mm.

If Keystone correction is to be performed, a portion of the data is deleted such that the image to be projected onto the projection surface takes the shape of a rectangle. For this reason, the resolution in the direction W on the side far from the information processing apparatus 109 decreases. The resolution of the rectangular image 201 that has undergone Keystone correction is as follows. As described previously, the direction W is formed with 1280 dots, and therefore the resolution (dpi) in the direction W on the side near the information processing apparatus 109 is 52 dpi (=1280×25.4/620). Also, the resolution (dpi) in the direction W on the side far from the information processing apparatus 109 is 45 dpi (=1280×25.4/716). The resolution (dpi) in the direction H as well gradually changes in the direction H, and therefore the side near the information processing apparatus 109 is 52 dpi and the far side is 45 dpi, which is similar to the direction W.

The camera 105 captures an image so that the image is symmetrical with respect to an optical axis, like a general camera. Let the light beam projected through an optical axis of a lens be SC. The camera 105 is mounted with a 1/1.7 model CMOS sensor as an image capturing element, and the resolution is determined by the number of pixels of the image capturing element. The resolution here indicates how much image information is picked up per unit of length, and corresponds to the number of pixels of the image capturing element. The present embodiment is provided with an image capturing element that has 4072 pixels in the direction W and 3046 pixels in the direction H in FIG. 12. The image capturing element is not limited to a CMOS sensor, but may also be a CCD or the like. The camera 105 is arranged so as not to physically interfere with the projector 106, as well as being arranged such that it can capture an image of a region whose center is approximately the same as the projection area.

FIG. 13 shows the image capturing area when viewed facing the projection surface 110. The optical axis of the camera 105 is inclined, and therefore the image of an image capturing area 301 on the projection surface that is to be captured takes the shape of a trapezoid. In the present embodiment, the required image size is larger than or equal to W=420 mm and larger than or equal to H=297 mm, so as to allow for imaging of an A3 original 302. Accordingly, the image capturing area 301 is required to be a size larger than or equal to 420 mm×297 mm.

As shown in FIG. 10, it is assumed that the optical axis of the camera 105 is 33° relative to an axis that is perpendicular to the projection surface, and that the distance between the imaging capturing unit and the projection surface 110 in the optical axis portion is 900 mm. An A3 original to be imaged is placed in the center of the image capturing area 301. W1 is the length of the image capturing area 301 on the side near the information processing apparatus 109. W2 is the length of the image capturing area on the side far from the information processing area 109. W3 is the length of the projection area in the direction W when capturing an image of a side of the original 302 on the side near the information processing apparatus 109. W4 is the length of the image capturing area when capturing an image of a side of the original 302 on the side from the information processing apparatus 109. At this time, W1=426 mm, W2=555 mm, W3=439 mm, and W4=525 mm. As described previously, the direction W is formed with 4072 dots, and therefore the resolution (dpi) in the direction W of the original 302 on the side near the information processing apparatus 109 is 236 dpi (=4072×25.4/439). Also, the resolution (dpi) of the original 302 on the side far from the information processing apparatus 109 in the direction W is 197 (=3046×25.4/525). The resolution (dpi) in the direction H gradually changes as well, and therefore is 236 dpi on the side near the information processing apparatus 109 and 197 dpi at the far side.

In this way, the smaller the angle between the optical axis and the axis perpendicular to the projection surface is, the less likely a decrease in resolution is to occur. Also, the closer to the projection surface 110, the smaller the angle between the optical axis and the axis that is perpendicular to the projection surface. In view of this, the number of dots that can be imaged in the direction W of the projector 106 and the number of pixels of the image capturing unit of the camera 105 that can be imaged in the direction W are compared, and the component with the lower resolution (the number of dots in the case of the projector, and the number of pixels in the case of the camera) is brought near to the projection area. Also, the component with the lower resolution (the number of dots in the case of the projector, and the number of pixels in the case of the camera) is arranged so that the angle between the optical axis and the axis perpendicular to the projection surface is small. In the present embodiment, deterioration of the resolution is suppressed by arranging the projector 106 that has a low resolution on the side near the projection area.

There are cases of the information processing apparatus 109 projecting the image captured by the camera 105 onto the projection surface 110 with the projector 106. In this case, the resolution of the image to be projected onto the projection surface 110 is matched with that of the lowest resolution out of the resolution of the camera 105 and the resolution of the projector 106. In the case of the present embodiment, an image of the original 302 on the side far from the information processing apparatus 109 can be captured at 197 dpi with the camera 105, but the projector can only project at a resolution up to 45 dpi. For this reason, a reduction in the resolution of the image projected onto the projection surface 110 can be suppressed by arranging the component with the lower resolution on the side near to the projection area.

Supposing a case in which the projector 106 is arranged far away from the information processing apparatus, it is thought that the resolution of the projector will decrease to 45 dpi or less and lead to a decrease in image quality. Note that in the present embodiment, the case described is the case in which the resolution of the camera 105 is higher than the resolution of the projector 106. Supposing a case in which the resolution of the camera 105 is lower than the resolution of the projector 106, a reduction in the resolution of the image projected onto the projection surface 110 can be suppressed by arranging the camera 105 with a low resolution on the side near the projection area (see FIG. 17).

Figure 14:
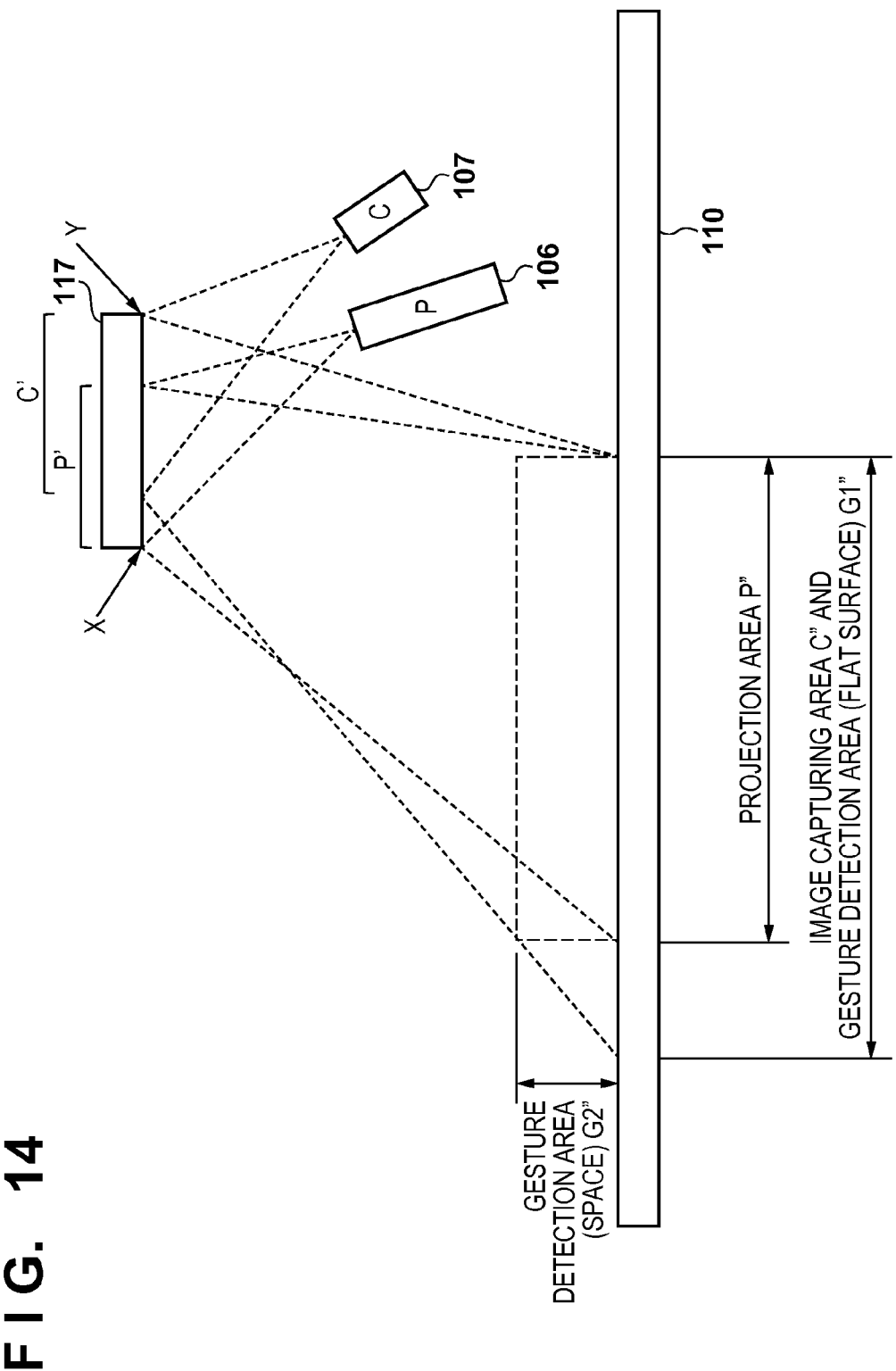
FIG. 14 is a diagram showing an example from which the gesture sensor has been omitted.

Note that in the description above, a case was described in which all three of the camera 105, the projector 106, and the gesture sensor 107 are used. However, it is possible to combine the function of the gesture sensor 107 with the camera 105. As shown in FIG. 14, by imaging the motion of the hand of the user with the camera 105, the motion of the hand of the user is detected, and it is possible to omit the gesture sensor 107. In doing so, the cost of the information processing apparatus can be further reduced.

Second Embodiment

The information processing apparatus 109 of the first embodiment has a configuration in which the image capturing use area C' and the projection use area P' on the mirror 117 partially overlap. The information processing apparatus 109 of a second embodiment has a configuration in which the image capturing use area C' and the projection use area P' on the mirror 117 do not overlap. Other configurations are the same as the first embodiment, and as such, their descriptions are omitted.

FIG. 18 is a side view (corresponding to FIG. 10 of the first embodiment) showing the optical path of the information processing apparatus 109 when viewed from the second direction in the second embodiment. FIG. 19 is a side view (corresponding to FIG. 11 of the first embodiment) showing the optical path of the information processing apparatus 109 as a comparative example.

The gesture sensor 107 is arranged in a virtual triangle 208 formed by the optical path on the camera side (image capturing unit side) of the luminous flux of the projector 106 (the rightward solid line extending from the projector 106 in FIG. 18), the optical path on the projector side (projection unit side) of the luminous flux of the camera 105 (the leftward dashed line and dashed-dotted line extending from the camera 105 in FIG. 18), and the projection surface 110. Then, assuming that out of the image capturing use area C' and the projection use area P', the point on a side near the projection surface on which the projection area P''' is formed is α, and the point on the side far from the projection surface is β, the gesture detection use area G' is to be contained between α and β. In doing so, reduction of the size of the mirror 117 in the first direction (the horizontal direction of FIG. 18) can be realized, similarly to the first embodiment.

Note that, in the second embodiment as well, arrangement is performed such that an angle θ1 formed between the optical axis of the component (the projector in the present embodiment) with a lower resolution (the number of dots in the case of the projector and the number of pixels in the case of the camera) and the axis perpendicular to the projection surface is set smaller than an angle θ2 formed between the optical axis of the component (the camera here) with a higher resolution and the axis perpendicular to the projection surface.

On the other hand, the case in which the camera 105 is arranged outward of the projector 106 and the gesture sensor 107 is arranged outward of the camera 105 will be described with reference to FIG. 19. At this time, in the first direction, the projection area P''' and the nearest point X in the mirror 117 are determined by the projection use area P' that is the optical path of the projector 106, which is similar to FIG. 18. On the other hand, in the first direction, the projection area P''' and the furthest point Y in the mirror 117 are determined by the gesture detection use area G' that is the optical path of the gesture sensor 107. The gesture detection area G1'' that is needed for the gesture sensor 107 is larger than the image capturing area C''' that is needed for the camera 105, and therefore the point Y is positioned outward of the point Y in FIG. 10. Specifically, Y exists at a position outward of β. As a result, there is a need to provide the mirror 117 such that it is outward of β in order to obtain the gesture detection use area G', and the size of the mirror 117 increases in the second direction.

In the second embodiment, the image capturing use area C' and the projection use area P' on the mirror 117 do not overlap. For this reason, the area of the mirror 117, with which the image capturing use area C' and the projection use area P' are used, becomes large compared to that of the mirror 117 in the first embodiment. However, an increase in the size of the mirror 117 can be prevented with the gesture sensor 107, by arranging the gesture sensor 107 at an appropriate position.

Note that in the configuration of the second embodiment as well, the number of dots that can be imaged in the direction W of the projector 106 and the number of pixels of the image capturing unit of the camera 105 that can be imaged in the direction W are compared, and the component with the lower resolution (the number of dots in the case of the projector, and the number of pixels in the case of the camera) is arranged near to the projection area. Also the component with the lower resolution (the number of dots in the case of the projector, and the number of pixels in the case of the camera) is arranged so that the angle between the optical axis and the axis perpendicular to the projection surface is small. In doing so, a reduction in the resolution of the image projected onto the projection surface 110 is suppressed.

As described above, a reduction in the resolution of the projection image can be suppressed by arranging the component with the lower resolution out of the projector 106 and the camera 105 as near as possible to the projection surface, or reducing the size of the angle between the projection optical axis and the projection surface. Also, the size of the mirror can be reduced by appropriately adjusting the use area of the camera, the projector, and the gesture sensor of the mirror.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-207544, filed Oct. 8, 2014 and 2015-169727, filed Aug. 28, 2015 which are hereby incorporated by reference herein in their entirety.

What is claimed is:

1. An information processing apparatus comprising:
    a projector configured to project an image;
    a projection mirror configured to reflect an image projected by the projector towards a projection surface;
    an image capturing unit configured to capture an image of a subject placed on the projection surface;
    an image capturing mirror configured to be arranged in an image capturing optical path from the subject to the image capturing unit in order to capture an image of the subject placed on the projection surface using the image capturing unit; and
    a frame configured to support a side surface of the projector such that the lower portion of the projector is distanced from other parts of the information processing apparatus,
    wherein the projector and the image capturing unit are arranged below the projection mirror and the image capturing mirror, and
    wherein the projector and the image capturing unit are provided at opposite sides of the frame to each other.

2. The information processing apparatus according to claim 1, wherein a sum of an optical path length of a light beam, which travels along an optical axis of the image capturing unit, from the image capturing unit to the projection surface is longer than a sum of an optical path length of a light beam, which travels along an optical axis of the projector, from the projector to the projection surface.

3. The information processing apparatus according to claim 1, wherein the projection mirror and the image capturing mirror are the same reflection mirror.

4. The information processing apparatus according to claim 3, further comprising:
    a detection sensor configured to detect motion of a detection target in a vicinity of the projection surface via the reflection mirror,
    wherein an area, in a direction that is parallel to an optical axis of the image capturing unit, of the reflection mirror to be used by the detection sensor is included in a total area that is formed by integrating (a) an area of the reflection mirror used by the image capturing unit and (b) an area of the reflection mirror used by the projector.

5. The information processing apparatus according to claim 3, wherein an area of the reflection mirror used by the projector and an area of the reflection mirror used by the image capturing unit at least partially overlap.

6. The information processing apparatus according to claim 3, further comprising:
a detection sensor configured to detect motion of a detection target in a vicinity of the projection surface via the reflection mirror,
wherein letting a direction that an optical axis of the image capturing unit faces when the optical axis is projected onto the projection surface is a first direction, and a direction that is orthogonal to the first direction be a second direction, and
wherein the detection sensor, when viewed in the second direction, is arranged in a virtual triangle that is formed by joining an optical path on an image capturing unit side of luminous flux from the projector, an optical path on a projector side of luminous flux from the image capturing unit, and the projection surface.

7. The information processing apparatus according to claim 6, wherein the reflection mirror is arranged in an upper portion of the information processing apparatus, and
wherein the projector and the image capturing unit are arranged at positions that are below the reflection mirror relative to the information processing apparatus.

8. The information processing apparatus according to claim 7, wherein an optical axis of the projector and an optical axis of the image capturing unit are directed toward the reflection mirror, and
wherein light that travels along the optical axis of the projector and the optical axis of the image capturing unit are reflected by the reflection mirror so as to be directed downward.

9. The information processing apparatus according to claim 1, wherein the projector is arranged at a position nearer to the projection surface than the image capturing unit is.

10. The information processing apparatus according to claim 1, wherein the projection surface is arranged below the information processing apparatus.

11. The information processing apparatus according to claim 1, further comprising:
a detection sensor configured to detect motion of a detection target in a vicinity of the projection surface,
wherein the detection sensor and the projector are provided on opposite sides of the frame to each other.

12. The information processing apparatus according to claim 11, wherein the detection sensor emits infrared light and detects motion of the detection target by receiving infrared light reflected by the detection target.

13. The information processing apparatus according to claim 1, wherein the image capturing unit also serves as a detection sensor that detects motion of a detection subject in a vicinity of the projection surface.

14. An information processing apparatus comprising:
a projector configured to project an image;
an image capturing unit configured to capture an image of a subject placed on the projection surface;
a reflection mirror (a) configured to reflect an image projected by the projector towards a projection surface and (b) configured to be arranged in an image capturing optical path from the subject to the image capturing unit, in order to capture, using the image capturing unit, an image of the subject placed on the projection surface; and
a detection sensor configured to detect, via the reflection mirror, motion of a detection target in a vicinity of the projection surface,
wherein the projector and the image capturing unit are arranged below the reflection mirror, and wherein, where a direction that an optical axis of the image capturing unit faces when the optical axis is projected onto the projection surface is a first direction, and a direction that is orthogonal to the first direction is a second direction, the detection sensor, when viewed in the second direction, is arranged in a virtual triangle that is formed by joining (a) an optical path on an image capturing unit side of luminous flux from the projector, (b) an optical path on a projector side of luminous flux from the image capturing unit, and (c) the projection surface.

15. The information processing apparatus according to claim 14, wherein an area, in a direction that is parallel to an optical axis of the image capturing unit, of the reflection mirror to be used by the detection sensor is included in a total area that is formed by integrating (a) an area of the reflection mirror used by the image capturing unit and (b) an area of the reflection mirror used by the projector.

16. The information processing apparatus according to claim 14, wherein the projector is arranged at a position nearer to the projection surface than the image capturing unit is.

17. The information processing apparatus according to claim 14, wherein the reflection mirror is arranged in an upper portion of the information processing apparatus, and
wherein the projector and the image capturing unit are arranged at positions that are below the reflection mirror relative to the information processing apparatus.

18. The information processing apparatus according to claim 14, wherein an optical axis of the projector and an optical axis of the image capturing unit are directed toward the reflection mirror, and
wherein light that travels along the optical axis of the projector and the optical axis of the image capturing unit are reflected by the reflection mirror so as to be directed downward.

19. The information processing apparatus according to claim 14, wherein the projection surface is arranged below the information processing apparatus.

20. The information processing apparatus according to claim 14, further comprising a frame configured to support the reflection mirror,
wherein the image capturing unit and the projector are provided at opposite sides of the frame to each other.

21. The information processing apparatus according to claim 14, further comprising a frame configured to support the reflection mirror,
wherein the detection sensor and the projector are provided at opposite sides of the frame to each other.

22. The information processing apparatus according to claim 14, wherein the detection sensor emits infrared light and detects motion of the detection target by receiving infrared light reflected by the detection target.

23. The information processing apparatus according to claim 14, wherein an area of the reflection mirror used by the projector and an area of the reflection mirror used by the image capturing unit at least partially overlap.

24. An information processing apparatus comprising:
a projector configured to project an image;
a projection mirror configured to reflect an image projected by the projector towards a projection surface, wherein the projector are arranged below the projection mirror;
an image capturing unit configured to capture an image of a subject placed on the projection surface;
an image capturing mirror configured to be arranged in an image capturing optical path from the subject to the image capturing unit in order to capture an image of the subject placed on the projection surface using the image capturing unit, wherein the image capturing unit are arranged below the image capturing mirror; and a wall member that has a flat surface portion, wherein the projector and the image capturing unit are arranged to oppose each other, sandwiching the flat surface portion of the wall member.

25. An information processing apparatus comprising:

a projector configured to project an image;

a projection mirror configured to reflect an image projected by the projector towards a projection surface;

an image capturing unit configured to capture an image of a subject placed on the projection surface; and an image capturing mirror configured to be arranged in an image capturing optical path from the subject to the image capturing unit in order to capture an image of the subject placed on the projection surface using the image capturing unit, wherein the projector and the image capturing unit are arranged below the projection mirror and the image capturing mirror, and wherein the projection mirror and the image capturing mirror are independent mirrors and the projection mirror and the image capturing mirror are arranged at different positions respectively.

26. The information processing apparatus according to claim 25, wherein a sum of an optical path length of a light beam, which travels along an optical axis of the image capturing unit, from the image capturing unit to the projection surface is longer than a sum of an optical path length of a light beam, which travels along an optical axis of the projector, from the projector to the projection surface.

27. The information processing apparatus according to claim 25, wherein the projector is arranged at a position nearer to the projection surface than the image capturing unit is.

28. The information processing apparatus according to claim 25, comprising a frame configured to support the projector, wherein the image capturing unit and the projector are provided at opposite sides of the frame to each other.

29. The information processing apparatus according to claim 25, further comprising a detection sensor configured to detect motion of a detection target in a vicinity of the projection surface, wherein the detection sensor and the projector are provided at opposite sides of the frame to each other.

30. The information processing apparatus according to claim 25, wherein the image capturing unit also serves as a detection sensor that detects motion of a detection subject in a vicinity of the projection surface.

* * * * *